(12) United States Patent
Fonseka et al.

(10) Patent No.: US 7,769,096 B2
(45) Date of Patent: Aug. 3, 2010

(54) QM-CPM MODEMS WITH HIGHER ORDER SIGNALING

(75) Inventors: John P. Fonseka, Plano, TX (US); Eric Morgan Dowling, San Jose, CA (US)

(73) Assignee: Trellis Phase Communications, LP, Marshall, TX (US)

( * ) Notice: Subject to any disclaimer, the term of this patent is extended or adjusted under 35 U.S.C. 154(b) by 824 days.

(21) Appl. No.: 11/603,850

(22) Filed: Nov. 22, 2006

(65) Prior Publication Data

US 2008/0118002 A1   May 22, 2008

(51) Int. Cl.
*H04L 23/02* (2006.01)
*H04L 27/28* (2006.01)

(52) U.S. Cl. .................. 375/265; 375/256; 375/274; 375/300; 375/259; 375/279; 375/302; 375/260; 375/280; 375/305; 375/268; 375/281; 375/261; 375/270; 375/295; 375/271; 375/298; 370/206; 370/208

(58) Field of Classification Search .................. 375/150, 375/262, 265, 327, 256, 259–261, 268, 270, 375/271, 274, 279–281, 295, 298, 300, 302, 375/305; 370/206, 208
See application file for complete search history.

(56) References Cited

U.S. PATENT DOCUMENTS

| | | | |
|---|---|---|---|
| 4,603,393 A * | 7/1986 | Laurent et al. | ............... 329/306 |
| 4,835,791 A | 5/1989 | Daoud | |
| 5,852,476 A | 12/1998 | Limberg | |
| 5,953,370 A * | 9/1999 | Durrant et al. | ............... 375/150 |
| 6,477,208 B1 * | 11/2002 | Huff | ........................... 375/265 |
| 6,667,760 B1 | 12/2003 | Limberg | |
| 6,947,509 B1 | 9/2005 | Wong | |
| 7,532,676 B2 | 5/2009 | Fonseka et al. | |
| 7,609,614 B2 | 10/2009 | Fonseka et al. | |

(Continued)

OTHER PUBLICATIONS

Tassduq et al., "OFDM-CPM Signals," Electronic Letters, Jan. 2002, vol. 38, No. 2, pp. 80-81.
J.P. Fonseka, E.M. Dowling, and C.C. Teng, "Quadrature-Multiplexed CPM," IEEE Transactions on Communications, vol. 56, No. 9, Sep. 2008, pp. 1487-1497.

*Primary Examiner*—Mohammad H Ghayour
*Assistant Examiner*—Eboni Giles
(74) *Attorney, Agent, or Firm*—Eric M. Dowling

(57) ABSTRACT

A quadrature-multiplexed continuous phase modulation (QM-CPM) signal is made up of the real parts of two underlying CPM signals whose information content can be recovered from just their real parts. The real parts of two such signals are I/Q multiplexed and transmitted onto a single channel to approximately double the bits/Hz of the underlying CPM signals, while maintaining the same or similar minimum distance. A class of QM-CPFSK (QM-continuous phase frequency shift keyed) signals are presented that use binary signaling but more phase states, and $M^2$-ary QM-CPFSK signals are derived from constant envelope M-ary CPFSK signals. $M^2$-ary multi-amplitude CPFSK signaling schemes are constructed that maintain the same distance as known multi-amplitude CPFSK schemes, but more than double the bandwidth efficiency in bits/Hz. In addition to these CPFSK based embodiments, embodiments are provided that more generally use CPM, non-continuous phase modulated signals, and even trellis-based PAM based signals.

16 Claims, 13 Drawing Sheets

U.S. PATENT DOCUMENTS

| | | | |
|---|---|---|---|
| 2005/0276345 A1* | 12/2005 | Norris et al. | 375/265 |
| 2006/0098753 A1* | 5/2006 | Norris et al. | 375/265 |
| 2007/0092018 A1 | 4/2007 | Fonseka et al. | |
| 2007/0115800 A1 | 5/2007 | Fonseka et al. | |
| 2009/0279422 A1 | 11/2009 | Fonseka et al. | |
| 2009/0316627 A1 | 12/2009 | Fonseka et al. | |

* cited by examiner

| Scheme | $h$ | $B_{99}T_b$ | $d^2_{min}$ | PAPR | $d^2_{min}$-Gain | $B_{99}T_b$ Reduction |
|---|---|---|---|---|---|---|
| QM-MSK | 0.5 | 0.6 | 2.0 | 1.707 | - | - |
| 2-ary CPFSK | 0.146 | 0.6 | 0.2689 | 1 | 8.7dB | - |
| 2-ary CPFSK | 0.5 | 1.2 | 2.0 | 1 | - | 50% |
| 4-ary CPFSK | 0.182 | 0.6 | 0.816 | 1 | 3.89dB | - |
| 4-ary CPFSK | 0.302 | 0.929 | 2.0 | 1 | - | 35% |
| 4-ary RRC-QAM | - | 0.6 | 2.0 | 2.6 | - | - |

FIG. 4

| $m_1(t)$ | $m_2(t)$ | $m_3(t)$ | $r_2$ | $r_3$ | $\tau_2, \tau_3$ | $\tau_{I/Q}$ | $B_{99}$ | $d^2min$ | PAPR | # of States |
|---|---|---|---|---|---|---|---|---|---|---|
| 3A | MSK | MSK | 0.48 | 0.48 | T/3,T/3 | T/2 | 0.1770 | 0.3321 | 5.7471 | 72 |
| 3A | 3A | - | 0.79 | - | T/2,T/2 | T/2 | 0.1795 | 0.2420 | 4.5247 | 48 |
| MSK | MSK | MSK | 0.5 | 0.25 | - | T/2 | 0.20 | 0.2857 | 3.9832 | 8 |
| 4A | MSK | - | 0.37 | - | T/2,T/2 | T/2 | 0.2095 | 0.3650 | 3.5647 | 32 |
| 3A | MSK | - | 1.63 | - | - | T/2 | 0.2479 | 0.4245 | 3.5380 | 6 |
| 3A | MSK | - | 0.56 | - | T/2,T/2 | 7T/32 | 0.2479 | 0.6894 | 3.8922 | 18 |
| MSK | MSK | - | 1 | - | T/2,T/2 | T/4 | 0.30 | 0.9784 | 3.2843 | 8 |
| MSK | MSK | - | 0.5 | - | - | T/2 | 0.30 | 0.8 | 3.0728 | 4 |
| 128-ary RRC 20% XS QAM | | | | | | | 0.17 | 0.1321 | 6.72 | MF=40T |
| 64-ary RRC 20% XS QAM | | | | | | | 0.2 | .2857 | 6.07 | MF=40T |
| 32-ary RRC 20% XS QAM | | | | | | | 0.24 | 0.3846 | 5.80 | MF=40T |
| 16-ary RRC 20% XS QAM | | | | | | | 0.3 | 0.8 | 4.68 | MF=40T |

FIG. 12

QM-CPM MODEMS WITH HIGHER ORDER SIGNALING

BACKGROUND OF THE INVENTION

1. Field of the Invention

This invention relates generally to communication transmitters, receivers, and systems. More particularly, the invention relates to a class of bandwidth efficient modulation schemes and their use in the design and implementation of trellis based modems.

2. Description of the Related Art

Modulation techniques that can pass more information through a fixed bandwidth are generally desirable. Specific needs exist for improved bandwidth-efficient modulation schemes for use in applications like DSL modems, cable modems, broadband wireless access (e.g., WiMAX, 802.16, 802.16a), wireless local area networks (e.g., WiFi, 802.11), personal area networks (e.g., Bluetooth), terrestrial HDTV channels, digital cable TV channels, satellite communications, cellular telephones, wide-area cellular telephony based endpoints (e.g., GSM EDGE, 2.5G, 3G and 4G terminals and base stations), and the like. In all such systems, a "modem" is, a MODulator/DEModulator device that implements at least a physical layer protocol in the transmit and/or receive directions.

U.S. patent application Ser. 11/253,730: "Single sideband and quadrature multiplexed continuous phase modulation" and Ser. No. 11/374,217: "Uplink Modulation and Receiver Structures for Asymmetric OFDMA Systems" are incorporated herein by reference. These US patent applications, written by the same inventors as the instant application, present a broad class of signaling schemes called SSB-FM as defined therein. A subclass of SSB-FM signaling schemes is called quadrature-multiplexed (QM) continuous phase modulation (CPM), i.e., QM-CPM. Multi-amplitude QM-CPM schemes and generalizations thereof were also presented in U.S. patent application Ser. 11/253,730.

Additional species of the genus of inventions presented in the two aforementioned prior US Patent applications would be desirable. In particular, multi-state binary QM-CPM signaling schemes would be advantageous. Similarly, additional efficiencies could be achieved by the advent of higher order $M^2$-ary QM-CPM derived from M-ary CPM (M>2). Given such $M^2$-ary QM-CPM schemes, it would be advantageous to construct $N^2$-ary multi-amplitude QM-CPM by applying multi-amplitude signaling to the M-ary CPM, i.e., (N>M>2, N=LM, L>1). Hybrid multi-amplitude QM-CPM signaling schemes made up of more than one underlying CPM scheme would also be advantageous. These additional species of the previously disclosed SSB-FM and QM-CPM genus-inventions and specific optimized parameter sets that produce especially high performance would be useful.

Also needed are specific generalizations of the QM-CPM species as described in the paragraph above that use any phase modulation (PM) which includes and subsumes frequency modulation (FM), but more generally than CPM, i.e., with or without a continuous phase.

SUMMARY OF THE INVENTION

A QM-CPM signal can be generated by selecting a baseband CPM signal whose information content can be recovered from just its real part. The real parts of two such signals are then I/Q multiplexed and transmitted onto a single channel. This process usually trades away CPM's constant envelope property, but obtains twice or approximately twice the bits/Hz while maintaining the same minimum distance. For example, QM-MSK (QM-minimum shift keying) doubles the bits/Hz over MSK while maintaining MSK's $d_{min}^2=2.0$.

The present invention centers on new species of the SSB-FM/QM-CPM genus of inventions as presented in the aforementioned two prior patent applications. The present invention focuses on multi-state binary QM-CPM signaling schemes, (higher order) $M^2$-ary QM-CPM derived from M-ary CPM (M>2), $N^2$-ary multi-amplitude QM-CPM derived from M-ary CPM (N>M>2, N=LM, L>1), and hybrid multi-amplitude QM-CPM signaling schemes made up of more than one underlying CPM (or PM) scheme.

A first aspect of the present invention relates to a method for generating quadrature multiplexed communication signals. A phase function that represents binary data is generated. This phase function uses more than two phase states in the positive imaginary half-plane (e.g., above the real axis in FIG. 5). At least the real parts of first and second continuous phase modulation (CPM) signals are then generated using the phase function. The real parts of the first and second CPM signals are then quadrature multiplexed onto respective I and Q channels to form a QM-CPM signal.

Signals according to the first aspect of the invention can be decoded by locking onto the carrier phase and the symbol timing of a received signal, for example, using maximum likelihood phase locking and symbol timing loops. The in-phase and quadrature phase signals are separated into I and Q paths in an I/Q demodulator. Each path is then preferably decoded using a Viterbi decoder designed to perform ML (maximum likelihood) sequence estimation decoding of trellis paths that correspond to binary data (two possible phase transitions out of each trellis state). Because there are more than two phase states with positive real parts, there will be more than two trellis states. Trellis states in the Viterbi decoder correspond to the real parts of the phase states of the phase function (see FIG. 5).

A second aspect of the present invention relates to a method for generating higher order quadrature multiplexed communication signals. A phase function, for example a CPM phase function, that represents M-ary data is generated. In this case, M is an integer greater than two, so that the phase function encodes more than one bit of information per symbol interval. This is achieved by using more than two phase state transitions to represent more than two possible communication symbols each symbol interval. Next respective real parts of first and second continuous phase modulation (CPM) signals are generated using the phase function (e.g., see equations (1)-(4) below). Next the respective real parts of the first and second CPM signals are quadrature multiplexed to form an $M^2$-ary QM-CPM signal (e.g., see equations (5) or (6) below). These same $M^2$-ary QM-CPM signals can be used to generate $N^2$-ary QM-CPM signals (N>M>2, N=LM, L>1) by taking linear combinations of L of these $M^2$-ary QM-CPM signals.

Signals according to the second aspect of the invention can be decoded by locking onto the carrier phase and the symbol timing of a received QM-CPM signal using, for example, maximum likelihood phase locking and symbol timing loops. The in-phase and quadrature phase signals are separated into I and Q paths in an I/Q demodulator. Each path is then preferably decoded using a Viterbi decoder designed to perform ML decoding of trellis paths that correspond to M-ary data (M possible phase transitions out of each trellis state) or $N^2$-ary data in the multi-amplitude case.

A third aspect of the present invention relates to a method for generating hybrid multi-amplitude communication signals. A first continuous phase modulation (CPM) signal is generated by driving a first phase function that uses a first parameter set (e.g., see equations (1) and (3) below) with a first data sequence. A second continuous CPM signal is generated by driving a second phase function that uses a second parameter set (e.g., see equations (1) and (3) below) with a second data sequence. The first and second CPM signals are then combined (e.g., see equation (19) below) to construct a hybrid multi-amplitude CPM signal.

Signals according to the third aspect of the invention can be decoded by locking onto the carrier phase and the symbol timing using maximum likelihood phase locking and symbol timing loops. The in-phase and quadrature phase signals are separated into I and Q paths in an I/Q demodulator. The CPM signals are preferably decoded using a Viterbi decoder designed to perform ML sequence detection/decoding of trellis paths using a multi-amplitude CPM trellis decoder designed to account for the hybrid signal structure.

A fourth aspect of the present invention relates to a method for generating a hybrid multi-amplitude quadrature multiplexed communication signals. Respective real parts of first and second continuous phase modulation (CPM) signals are generated using a first parameter set (e.g., see equations (1)-(3)). Respective real parts of third and fourth CPM signals are also generated, but using a second parameter set which is different than the first parameter set (e.g., different parameters in equations (1) and (3)). The real parts of the first and second CPM signals are combined to construct the real part of a first multi-amplitude CPM signal. The real parts of the third and fourth CPM signals are then combined to construct the real part of a second multi-amplitude CPM signal. The real parts of a first and second multi-amplitude CPM signals are then quadrature multiplexed to form a hybrid multi-amplitude QM-CPM signal.

Signals according to the fourth aspect of the invention can be decoded by locking onto the carrier phase and the symbol timing using maximum likelihood phase locking and symbol timing loops. The in-phase and quadrature phase signals are separated into I and Q paths in an I/Q demodulator. Each path is then preferably decoded using a Viterbi decoder designed to perform ML sequence detection/decoding of trellis paths that correspond to the real-parts of the hybrid multi-amplitude signals. The Viterbi decoder's trellis states correspond to the real parts of the phase states in the hybrid multi-amplitude CPM scheme.

In any of the aforementioned aspects or any embodiments described below, the phase functions can alternatively involve discontinuous phase jumps between the phase states. For example, in the alternative embodiments, the continuous phase property is not required, as long as removal of the continuous phase property does not give rise to an unresolvable phase ambiguity. Hence, where applicable, CPM can be substituted with PM in the embodiments described above. Also, while this application focuses on continuous phase frequency shift keying (CPFSK) based embodiments for illustrative purposes only, the phase functions can use shaped/smoothed phase transitions to further conserve on bandwidth. Likewise, partial response signaling can be employed to create alternative embodiments to conserve on bandwidth as well. All such embodiments and variations are contemplated by the present invention.

In any of the aforementioned aspects or any embodiments described below, Viterbi decoders can be designed to jointly estimate the I and Q components of the QM-CPM signal. Such aspects and embodiments use noncoherent detection as per U.S. patent application Ser. No. 11/374,217 as incorporated herein by reference above.

In any of the aforementioned aspects or any embodiments described below, due to the ability to pre-phase-rotate signals in equations (1)-(3) below, the "real part" can equivalently correspond to taking a projection onto any line passing through the origin of the complex (I/Q) plane. Hence all such rotations are contemplated by the "real part" language all throughout the specification and claims herein.

BRIEF DESCRIPTION OF THE FIGURES

The various novel features of the present invention are illustrated in the figures/drawing listed below and described in the detailed description that follows.

FIG. 4: A table that compares QM-MSK with ordinary CPFSK and 20% excess bandwidth 4-ary raised root cosine filtered QAM.

FIG. 12: A table that lists the parameters and properties of best multi-amplitude QM-CPFSK embodiments found to date.

DETAILED DESCRIPTION OF THE PREFERRED EMBODIMENTS

I. CPM and QM-CPM Signal Models

Figure 1:
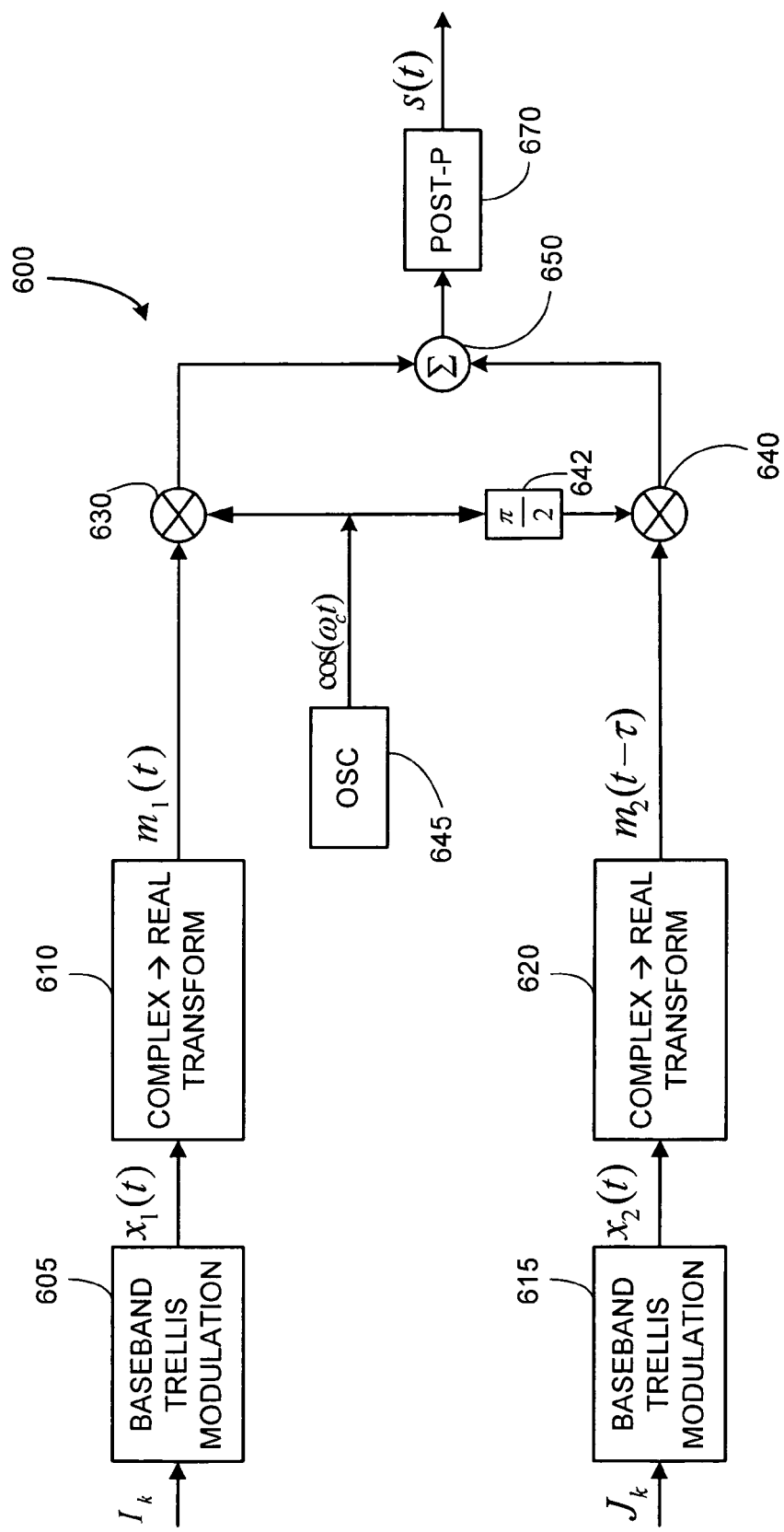
FIG. 1 is a block diagram illustrating a transmitter structure for quadrature-multiplexed CPM (QM-CPM), and similar quadrature-multiplexed SSB-FM signaling schemes, showing how to place two information sequences into the bandwidth occupied by a single corresponding complex-valued signal.

A continuous phase modulation (CPM) baseband signal may be expressed as:

$$x(t)=Ae^{j\alpha(t)}=A[\cos(\alpha(t))+j\sin(\alpha(t))], \quad (1)$$

where A is a constant amplitude, and α(t) is a phase function. Define an information sequence I=( . . . , $I_{k-1}$, $I_k$, $I_{k+1}$, . . . ). $I_k$ ∈{−1,+1}. Then the CPM phase function may be written:

$$\alpha(t) = 2\pi \sum_{k=-\infty}^{\infty} h_k I_k \int_{-\infty}^{t} g(\tau - kT) d\tau + \beta \quad (2)$$

where, $h_k$ is a modulation index used in the $k^{th}$ symbol interval, T is a symbol duration, g(t) is a baseband pulse-shape waveform, and β is a fixed phase-offset. Without loss of generality, to keep the development focused, in this patent application we consider a rectangular waveform, g(t)=u(t)−u(t−T), that is nonzero only for 0≦t<T, corresponding to full response CPFSK. The phase function of equation (2) can be written:

$$\alpha(t) = \theta_k + 2\pi h_k I_k \left(\frac{t-kT}{2T}\right) + \beta \text{ for } kT \le t < (k+1)T \quad (3)$$

$$\text{where, } \theta_k = \pi \sum_{i=-\infty}^{k-1} h_i I_i$$

is the accumulated phase at the beginning of the $k^{th}$ symbol interval, and $h_k$ and T are the same as in equation (2). The values $\theta_k$ are known as "phase states" of the CPM signal. By equation (3), sequences of phase states are recursively related to the information sequence via $\theta_{k+1}=\theta_k+\pi h_k I_k$. Hence even without any trellis encoded modulation, CPM signals have their own inherent memory structure which allows $I_k$ to be recovered by identification and trellis decoding of the phase state sequence, $\{\theta_k\}$.

Hence, even in the uncoded case, a Viterbi decoder is thus used to recover $I_k$ from a received-signal estimate of x(t), to determine the most likely path of phase states, $\{\theta_k\}$, given a received version of the CPM signal, x(t), observed in the presence of noise. For further information regarding the use of Viterbi decoding to recover from equation (1) the information sequences embedded into equations (2)-(3), see the prior art descriptions of the Viterbi algorithm and the incorporated-by-reference applications.

Next define a real-valued message signal, m(t), to be a scaled version of the real part of the complex-valued CPM baseband signal, x(t). That is, let $$m(t) = \frac{1}{A}\text{Re}\{x(t)\} = \cos(\alpha(t)). \quad (4)$$

As we can see from equations (1)-(3), all the information carried by the complex-valued CPM baseband signal x(t) is encoded into its real-valued phase function α(t). So it stands to reason that we can find α(t)'s whose information content can be extracted from the real-valued function, cos(α(t)). To construct a QM-CPM signal, we start with two independent information sequences, $I_k$, $J_k$, apply these in equations (2)-(3) to generate two phase functions, $\alpha_1(t)$ and $\alpha_2(t)$, and generate via equation (1) two complex-valued CPM baseband signals, $x_1(t)$ and $x_2(t)$. The real parts of $x_1(t)$ and $x_2(t)$ are respectively extracted and scaled according to equation (4) to produce $m_I(t)$ and $m_Q(t)$. Then the baseband QM-CPM signal is formed using:

$$x_{QM-CPM}(t) = A[\cos(\alpha_1(t)) + j\cos(\alpha_2(t - \tau_{I/Q}))] \quad (5)$$

$$= A[m_I(t) + jm_Q(t - \tau_{I/Q})],$$

and the passband QM-CPM signal thus given by:

$$s(t) = A[m_I(t)\cos(\omega_c t) - m_Q(t-\tau_{I/Q})\sin(\omega_c t)], \quad (6)$$

where A is as in equation (1) and equation (4), and $\tau_{I/Q}$ is the time-shift between I and Q channels chosen to minimize the PAPR. For example, with QM-MSK signaling, $\tau_{I/Q}$=T/2 results in the minimum PAPR equal to 1.707. PAPR of other QM-CPM signals is investigated in hereinbelow.

In polar form, we can write s(t) as:

$$s(t) = A\sqrt{[m_I^2(t) + m_Q^2(t - \tau_{I/Q})]} \cos[\omega_c t + \theta(t)] \quad (7)$$

where $$\theta(t) = \tan^{-1}\left[\frac{m_Q(t - \tau_{I/Q})}{m_I(t)}\right] \quad (8)$$

is the phase variation of s(t). Since α(t) in equation (2) is continuous, $m_I(t)$ and $m_Q(t)$ will be continuous, so that θ(t) will also be also continuous. Therefore, from equations (7) and (8) we see that QM-CPM signals can be classified as CPM signals.

QM-CPM is based on the observation that complex-valued CPM baseband signals can be constructed whose information content can be recovered from just their real components. To understand why, consider an uncoded CPM signal x(t) with constant envelope, A. The magnitude of Im{x(t)} is related to the real component according to |Im{x(t)}|=$\sqrt{A^2-\text{Re}\{x^2(t)\}}$, and because of the continuous phase property, the sign of Im{x(t)} can be tracked with a phase trellis decoder. An ambiguity arises, though, if any of x(t)'s CPM phase trajectories are allowed to fork where Re{x(t)}±A, i.e., when Im{x(t)}=0. This ambiguity can be resolved if x(t)'s continuous phase function is designed to not include any phase trajectories that fork at these points. This design principle can also be used to construct ambiguity-free multi-amplitude CPM signals as linear combinations of constant envelope CPM signals. In some cases, this principle can be applied to discontinuous phase signals as well, so long as they are designed to avoid a phase ambiguity.

QM-CPM signal design involves selecting the parameters of the phase function (2)-(3) to: 1) provide an ambiguity-free phase trellis whose paths can be tracked by a trellis decoder which only observes m(t)=Re{x(t)}, 2) maximize the minimum distance of m(t)=Re{x(t)} at a given bandwidth, and 3) select $\tau_{I/Q}$ to minimize PAPR. Computer search programs similar to code search programs are used to find combinations of the parameters in equations (2) and (3) that produce the best QM-CPM schemes.

FIG. 1 is a block diagram of a QM-CPM modulator 600. Two information sequences, $I_k$, $J_k$ are modulated in baseband modulators 605, 615 in accordance, for example, with equations (1)-(3) to generate complex baseband signals $x_1(t)$, $x_2(t)$. Each of these complex baseband signals are then mapped via complex-to-real transformation blocks 610, 620 to real-valued envelope signals, $m_1(t)$, $m_2(t)$, for example, in accordance with equation (4). We note that the output of each complex-to-real transformation blocks 610, 620 can in general involve a complex scaling. In an illustrative embodiment, assume both transformations generate the same amplitude scaling, A, and the sine the transformation block 620 imparts an optional time-shift, $\tau_{I1Q}$ as per equations (5)-(6). The real-signal outputs of the transforms 610 620 are then respectively modulated onto in-phase and quadrature-phase carriers in mixers 630 and 640. The up-converted outputs of the mixers are then added together in summing junction 650 to produce an output signal, for example, as per equation (6). This is provided to an optional post processor 670 which applies amplitude scaling. In addition to any amplitude scaling performed in the optional block 670, the post processing may involve passing the output signal through a pulse shaper. The post processing pulse shaping may alternatively be performed individually in the I- and Q-channels, for example, prior to mixing by the mixers 630, 640.

Figure 2:
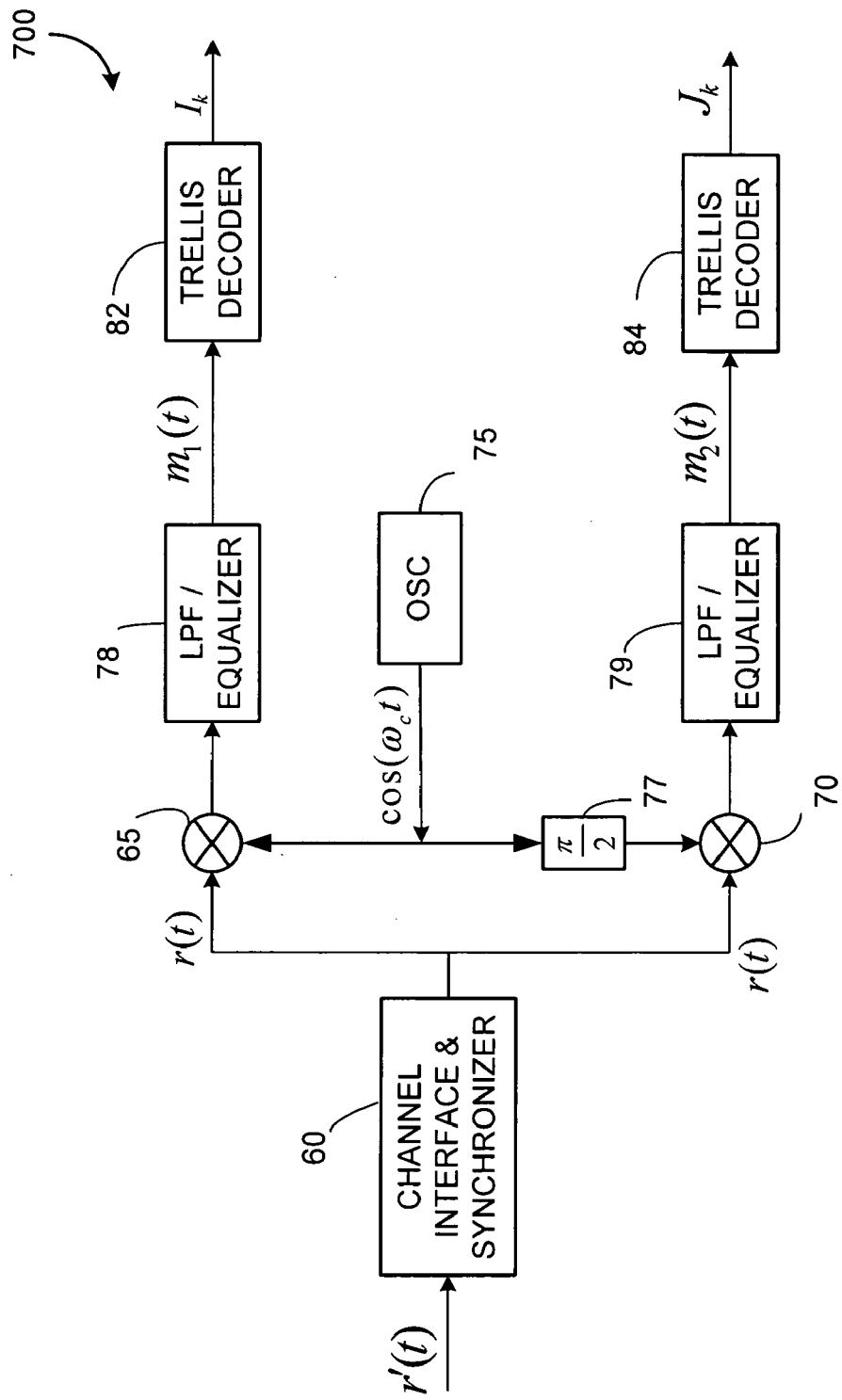
FIG. 2 is a block diagram of a receiver structure used to demodulate a received signal such as the one generated from the transmitter shown in FIG. 6.

FIG. 2 is a block diagram of a QM-CPM demodulator 700. An input signal is pre-processed by the channel interface and synchronizer 60. For example, 60 can perform any of down conversion to an intermediate frequency, RF filtering, pre-filtering, carrier recovery, and symbol timing recovery. The output of block 60 is passed to I/Q mixers 65, 70 and the resulting in-phase (I) and quadrature-phase (Q) signals are passed to filters 78, 79 and then to trellis decoders 82, 84 that preferably implement the Viterbi algorithm. As discussed in the incorporated-by-reference applications, note that while FIG. 2 uses two separate trellis decoders, non-coherent embodiments are possible. In such embodiments, the channel interface and synchronizer 60 does not perform carrier recovery and the two Viterbi decoders are implemented with a single joint decoder.

II. QM-MSK

CPFSK (continuous phase frequency shift keying) corresponds to equations (1)-(3) where the phase function $\alpha(t)$ is piece-wise linear, i.e., the phase states in equation (3) are connected by straight lines. MSK (minimum shift keying) corresponds to a specific type of CPFSK, specifically with $h_k=h=0.5$ for all k in equations (1)-(3).

Consider the case where equations (1)-(2) are used with $\beta=-\pi/4$ and $h=0.5$ to generate two independent MSK signals, $x_1(t)$ and $x_2(t)$. As demonstrated in Theorem 1 at the end of this application, when equations (4)-(6) are used to transform both $x_1(t)$ and $x_2(t)$ to a single QM-MSK signal, the bandwidth of the resulting QM-MSK signal is the same as the bandwidth of MSK. However, each symbol interval, QM-MSK sends two symbols, one symbol from each of both $x_1(t)$ and $x_2(t)$. Meanwhile, MSK only sends one symbol of $x_1(t)$ in the same symbol interval, so that QM-MSK achieves twice the bits/Hz as MSK. We next show that the minimum distance (and hence the BER) of QM-MSK is the same as that of ordinary MSK.

The probability of error of trellis based signaling schemes depend on the distance between the paths, and the asymptotic bit error probability $P_{be}$ is determined by the minimum Euclidean distance:

$$P_{be} \approx kQ\left(\sqrt{d_{min}^2 \frac{E_b}{N_0}}\right) \quad (9)$$

where $E_b$ is the energy in a bit, $d_{min}$ is the normalized minimum distance, k is number of paths with the minimum distance, and $Q(\cdot)$ is the standard Q-function. The performance of the QM-CPM signals also depends on the distance, but, in contrast to ordinary CPM signals, these distances are measured in terms of the real-valued trellis of m(t), as opposed to the phase trellis of x(t).

For MSK with the rectangular pulse shape, $g(t)=u(t)-u(t-T)$, considered herein, $\overline{m_1^2(t)}=\overline{m_Q^2(t-\pi)}=\frac{1}{2}$, so that assuming independent information sequences, $I_k$, $J_k$, the average transmitted power, $P_{avg}$ of the QM-MSK signal s(t) is given by $$P_{avg} = \frac{A^2}{2}\overline{[m_I^2(t) + m_Q^2(t-\tau)]} = \frac{A^2}{2} \quad (10)$$

where the overbar denotes a time average. The average symbol energy, $E_{av}$, and the average bit energies can be expressed as:

$$E_{av} = 2E_{b,av} = P_{av}T = \frac{A^2T}{2}, \text{ and } E_{b,av} = \frac{A^2T}{2}. \quad (11)$$

Figure 3A:
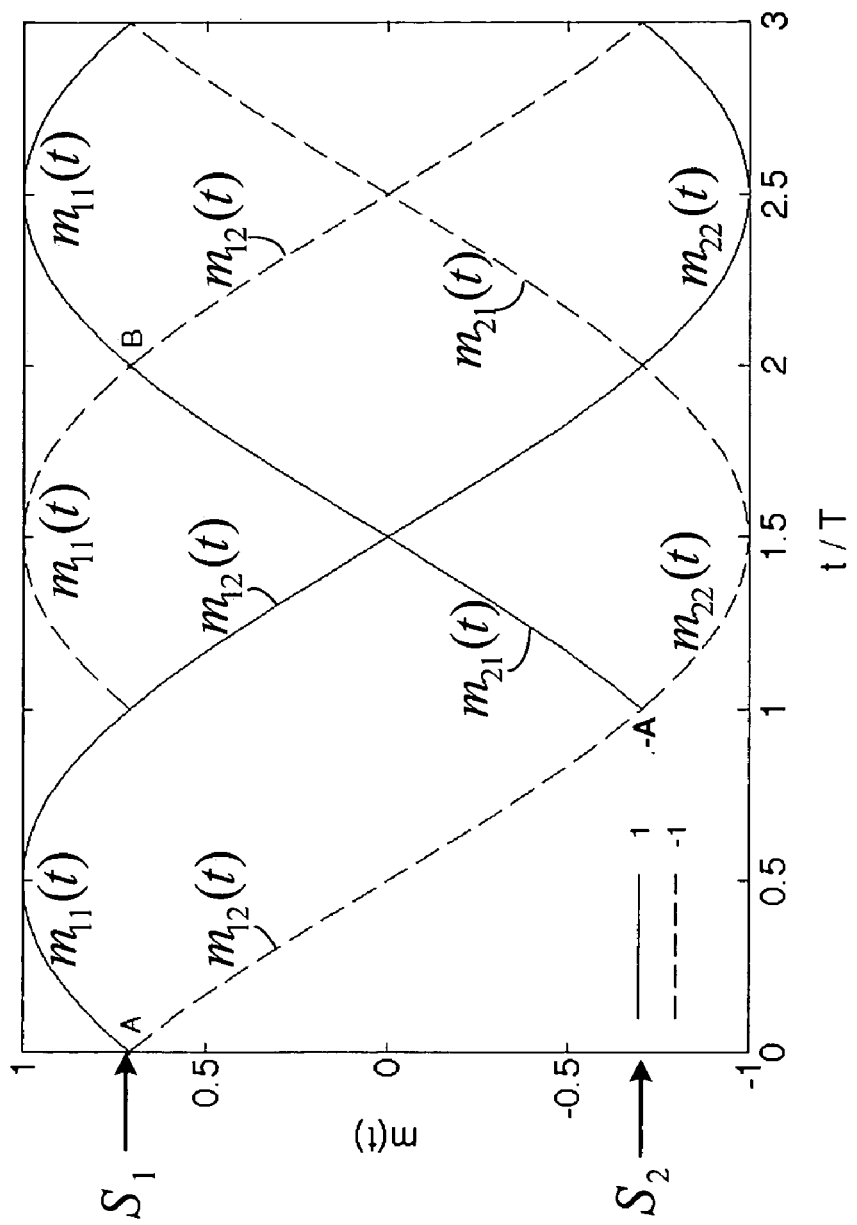
FIG. 3A: Trellis structure of QM-MSK component signal (a) m(t) signal, (b) logical trellis structure.
Figure 3B:
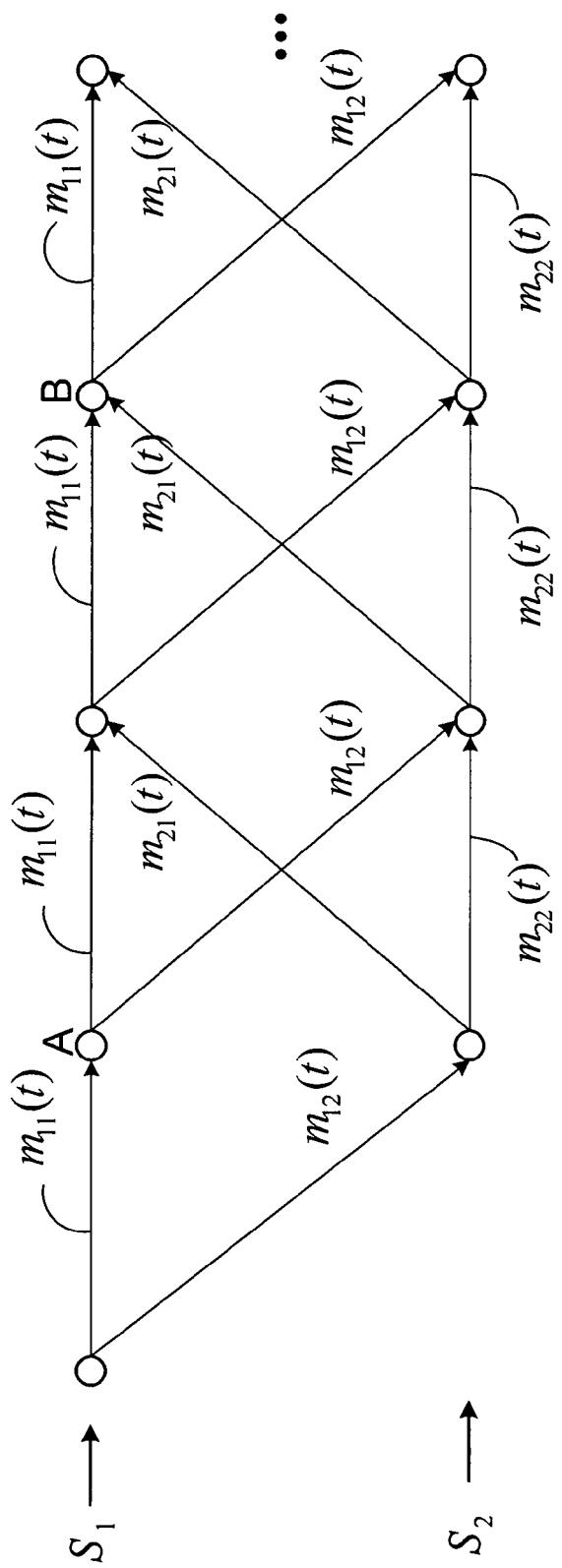
FIG. 3B is a table that compares QM-MSK with ordinary CPFSK and 20% excess bandwidth 4-ary RRC

The real-valued signals $m_I(t)$ and $m_Q(t)$ follow a set of trellis paths which are induced via equation (4) by the phase state transitions of equation (3). The trellis structure of $m(t)\in\{m_I(t),m_Q(t)\}$ derived from MSK with $\beta=-\pi/4$ is shown in FIG. 3a and the state transition logic of equation (3) of this signal is emphasized in FIG. 3b. As can be seen from FIG. 3, for QM-MSK, the minimum distance event occurs between the shortest merging events, i.e., two symbol periods. In order to find the minimum distance, we integrate the squared difference between different trellis paths over these two symbol periods, i.e., from the time when a path splits apart and later merges back together. Consider the two paths that originate and end at $\alpha(t)=-\lambda/4$ (starting at point A and re-merging at point B in FIG. 3) corresponding to the message sequences (+1,−1) and (−1,+1). Due to symmetry considerations, the squared distance between the paths between the merging events can be found by taking twice the distance between the signals during the first interval. This yields:

$$D^2 = 2\int_0^T \left\{\left[\cos\left(\frac{\pi t}{2T} - \frac{\pi}{4}\right)\right] - \left[\cos\left(-\frac{\pi t}{2T} - \frac{\pi}{4}\right)\right]\right\}^2 dt \quad (12)$$

$$= 4\int_0^T \sin^2\left(\frac{\pi t}{2T}\right)dt = 2T.$$

It can be similarly found that the merging events that originate from other values of $\alpha(t)=\{\pi/4, 3\pi/4, 5\pi/4\}$ also generate the same distance. Hence, the minimum squared distance of QM-MSK signals is $D_{min}^2=2T$.

Assuming an AWGN channel with psd (power spectral density) $N_0/2$, a received QM-MSK (or generally QM-CPM) signal observed in presence of noise can be written as $$r(t)=[m_1(t)+n_1(t)]\cos(\omega_c t)+[m_Q(t-\pi_{I1Q})+n_Q(t-\pi_{I1Q})]\sin(\omega_c t) \quad (13)$$

where $m_I(t)$ and $m_Q(t)$ are as per equations (4)-(6), and $n_I(t)$ and $n_Q(t)$ are the in-phase and quadrature-phase AWGN noise components. Because the demodulation/decoding of the in-phase channel is essentially the same as the quadrature-phase channel, focus on the in-phase channel whose receive signal may be written:

$$Z_I(t) = m_I(t) + \frac{n_I(t)}{A} = m_I(t) + n_1(t) \quad (14)$$

where the psd of $n_1(t)$ is $N_0/(A^2)$.

The event error probability corresponding to the above merging event follows from the distance as $$P_e = Q\left(\frac{D_{min}}{2\sigma}\right), \sigma^2 = \frac{N_0}{A^2} \quad (15)$$

$$P_e = Q\left(\sqrt{\frac{A^2 T}{2N_0}}\right).$$

The value of k in equation (9) for QM-MSK is k=1 (and also for ordinary MSK), so the bit error probability at high signal to noise ratios can therefore be approximately written following equations (11) and (15) as $$P_{be} \approx Q\left(\sqrt{\frac{2E_{b,avg}}{N_0}}\right), \quad (16)$$

and from equations (16) and (9), we see that $d_{min}^2=2$, so that the $d_{min}^2$ and the BER (bit error rate) for QM-MSK are the same as MSK. However, as shown in Theorem 1 at the end of this application, the bandwidth of QM-MSK is the same as that of MSK, so that QM-MSK has twice the bits/Hz as MSK while maintaining the same normalized minimum distance and BER. The receiver path memory length, $N_R$, of QM-MSK (which is the minimum number of intervals required to ensure that the distance between any two paths is at least the minimum distance) was numerically found to be $N_R=3$.

FIG. 3 shows the trellis structure of the message signals decode $m_I(t)$ and $m_Q(t)$. To decode QM-MSK, we use two identical Viterbi decoders to decode $m_I(t)$ and $m_Q(t)$. Using the notation of FIG. 3, for i, j∈{1,2}, the branch metrics used in each Viterbi decoder are given by:

$$B_{ij}(k) = \int_{kT}^{(k+1)T} [Z(t) - m_{ij}(t)]^2 dt. \quad (17)$$

When QM-MSK is implemented using $\beta=-\lambda/4$, the trellis of FIG. 3 results having two states corresponding to $$S_1 = \left\{m(t) = \frac{1}{\sqrt{2}}\right\} \text{ and } S_2 = \left\{m(t) = -\frac{1}{\sqrt{2}}\right\}.$$

The transition signals are given by $$m_{11}(t) = \cos\left(\frac{\pi t}{2T} - \frac{\pi}{4}\right),$$

$$m_{12}(t) = \cos\left(\frac{\pi t}{2T} - \frac{\pi}{4}\right),$$

-continued $$m_{21}(t) = \cos\left(\frac{\pi t}{2T} - \frac{3\pi}{4}\right) = -m_{12}(t),$$

and $$m_{22}(t) = \cos\left(\frac{\pi t}{2T} + \frac{3\pi}{4}\right) = -m_{11}(t).$$

Equation (3) imposes a path memory structure on $\alpha(t)$ and hence on $m(t)=\cos(\alpha(t))$. The Viterbi algorithm is then applied to find the trellis path with the lowest path metric. The Viterbi decoders for other QM-CPM modulation schemes are implemented similarly using the same basic approach as is used to decode ordinary CPM. In general, QM-CPM signals can be detected by performing I/Q carrier and symbol timing recovery, computing the set of branch metrics of equation (17) for the particular $m_I(t)$ or $m_Q(t)$ signal to be detected, (e.g., for the signals in FIG. 3a or 6), and using the branch metrics (17) in the Viterbi algorithm as is described in the prior art and the applications incorporated by reference herein to perform ML (maximum likelihood) sequence detection.

FIG. 4 compares the properties of QM-MSK to ordinary binary and 4-ary CPFSK schemes whose modulation index, h, is selected to match either QM-MSK's normalized bandwidth ($B_{99}T_b$) or its squared minimum free distance, $d_{min}^2$. When compared to binary CPFSK at the same bandwidth, QM-MSK provides an 8.7 dB improvement. When compared to binary CPFSK at the same free distance, QM-MSK achieves a 50% reduction in normalized bandwidth. However, since QM-MSK is actually a 4-ary scheme, it makes sense to compare QM-MSK to 4-ary CPFSK as well. When compared at the same normalized bandwidth, QM-MSK logs in a 3.89 dB gain over 4-ary CPFSK. When compared at the same free distance, QM-MSK provides a 35% bandwidth reduction over 4-ary CPFSK.

FIG. 4 also compares QM-MSK to a 4-ary QAM scheme that uses a square root raised cosine ("RRC") pulse shape with a 20% excess bandwidth. This version of QAM is selected for comparison because it has the same $B_{99}T_b=0.6$ and the same $d_{min}^2=2.0$ as 4-ary QM-MSK. However this comparable to a version of QAM that has an RRC pulse width that is forty symbol intervals long (but no Viterbi decoder is needed). Thus RRC QAM requires a long matched filter as opposed to the QM-MSK Viterbi decoder that has a path memory length of $N_R=3$. Also, 4-ary QM-MSK has a PAPR of 1.707 vs. 4-ary RRC QAM's (RRC QPSK's) PAPR of 2.6 which is due to the RRC filter.

III. QM-CPFSK Derived from Multi-State Binary CPFSK

Figure 5:
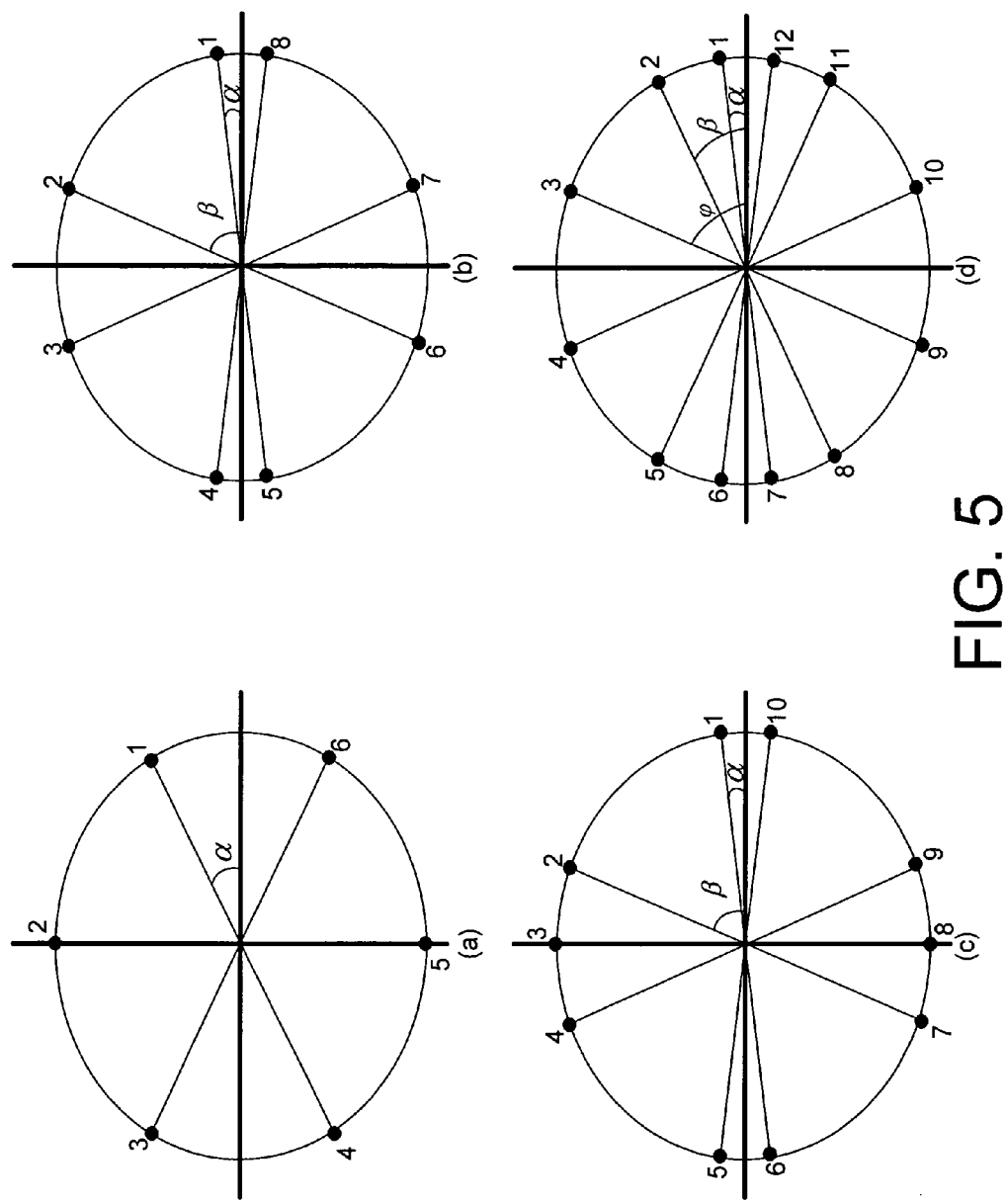
FIG. 5: Phase state constellations of binary CPFSK schemes respectively with three, four, five and six distinct real projections of phase states. The real components of these phase constellations are used as component signals to construct QM-CPFSK schemes: (a) scheme 3S, (b) scheme 4S, (c) scheme 5S, (d) scheme 6S.

FIG. 5 shows phase constellations form multi-state binary CPFSK signaling schemes used to build a class of QM-CPFSK signals. While QM-MSK is based on MSK which uses a modulation index of h=½ and four phase states, the same concepts can be applied to binary QM-CPFSK signaling schemes that have smaller modulation indices and more phase states. For example, consider phase state diagrams shown in FIG. 5 for binary CPFSK signaling schemes with six to twelve phase states. In each binary CPFSK scheme, given a current phase state, if a current bit to be transmitted corresponds to a logical zero, this gives rise to a linear phase transition to the closest phase state in the clockwise direction, and a logical one gives rise to a linear transition to the closest phase state in the counter-clockwise direction. Based on equations (4)-(5), the QM-CPFSK component signals, $m_I(t)$ and $m_Q(t)$, are equal to the real component of the phase diagrams of FIG. 5 and thus have three, four, five and six states respectively. Therefore, we call the QM-CPFSK schemes built from these phase constellations "3-state," "4-state," "5-state," and "6-state" QM-CPFSK (or, schemes 3S-6S).

As depicted in FIG. 5, each phase constellation diagram is parameterized by one or more angles. These angles serve as free parameters that can be varied to control $d_{min}^2$, bandwidth, and PAPR. These angles can also be adjusted to jointly optimize multi-amplitude QM-CPFSK signaling schemes built from one or more of the signaling schemes discussed herein. It can be noted that a class of 2-state CPFSK schemes can be similarly constructed using FIG. 5a, but with phase states 2 and 5 removed. However, it can be shown that $d_{min}^2$ in for this class of 2-state signaling schemes is insensitive to $\alpha$, and QM-MSK corresponds to the parameter selection that minimizes $B_{99}T_b$ over this class of 2-state signaling schemes.

Figure 6:
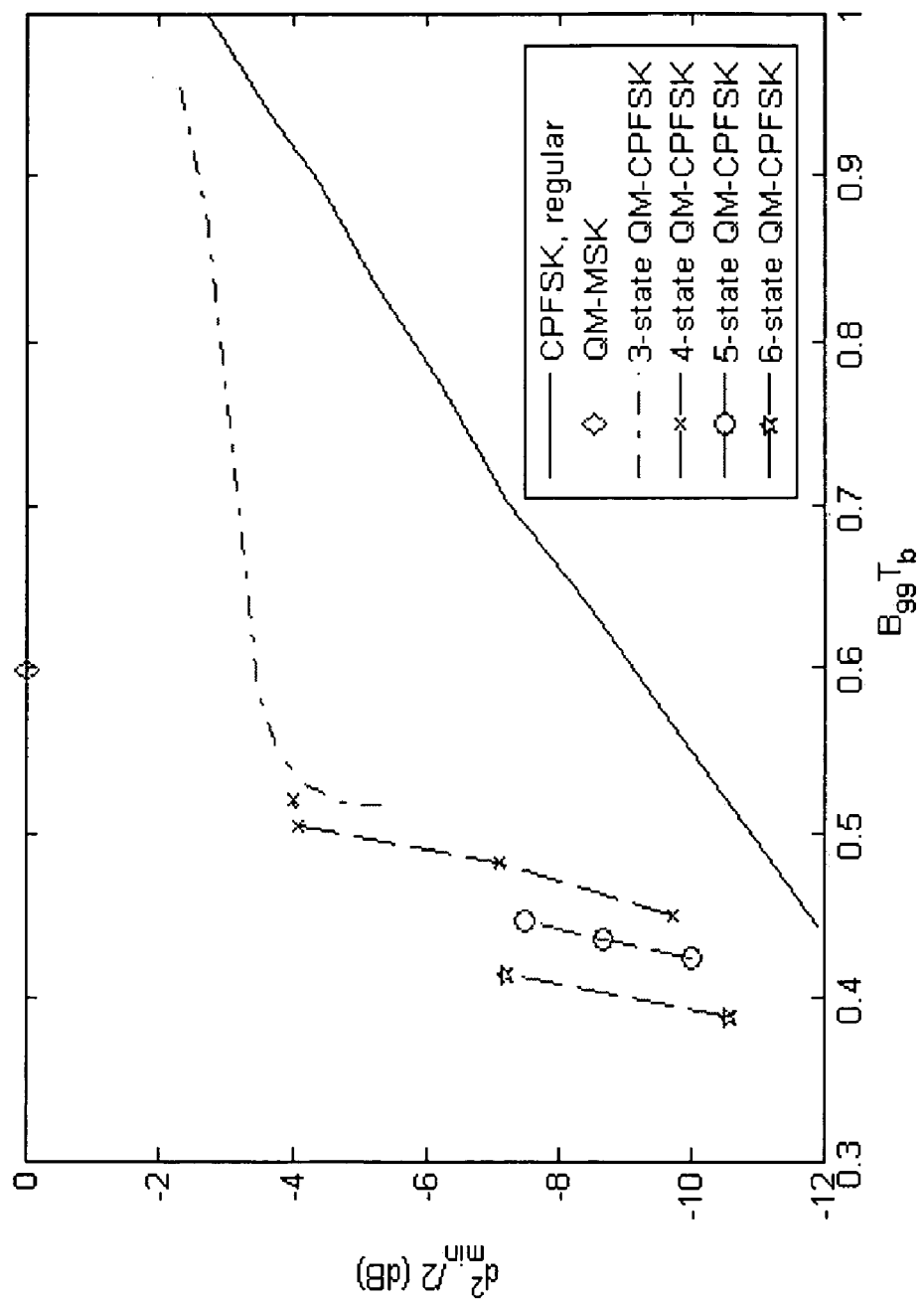
FIG. 6: Performance of QM-MSK and QM-CPFSK schemes 3S-6S compared to ordinary CPFSK whose modulation index, h, is swept to produce a range of performance-bandwidth characteristics.

FIG. 6 shows a set of curves comparing the distance-bandwidth performance of QM-MSK and schemes 3S-6S with ordinary binary CPFSK whose modulation index was swept to generate the CPFSK distance vs. bandwidth curve. The curve for schemes 3S was generated by sweeping $\alpha$ in FIG. 5a, and the curves for schemes 4S-6S were generated by varying the angles in FIG. 5b-2d and selecting combinations that provide good performance for each bandwidth. In scheme 3S, setting $\alpha=\pi/6$ corresponds to CPFSK with $h=\frac{1}{3}$, and in this case the proof of Theorem 1 at the end of this application applies and a full 50% bandwidth reduction is obtained in comparison to CPFSK. Likewise, the proof of Theorem 1 at the end of this application applies to any of schemes 3S-6S with equally spaced angles, yielding the 50% bandwidth reduction. QM-MSK and schemes 3S-6S provide a much better set of performance-bandwidth tradeoffs as compared to ordinary CPFSK, although, usually at the cost of the constant envelope property.

In connection with FIG. 1, this gives rise to embodiments where the phase function (1), (3) represents binary data and uses more than two phase states in the positive imaginary half-plane (e.g., above the real axis in FIG. 4). At least the real parts of first and second continuous phase modulation (CPM) signals are then generated using the phase function. The real parts of a first and second CPM signals are then quadrature multiplexed onto respective I and Q channels to form a QM-CPM signal.

Such signals can be decoded by locking onto the carrier phase and the symbol timing using maximum likelihood phase locking and symbol timing loops. The in-phase and quadrature phase signals are separated into I and Q paths in an I/Q demodulator. Each path is then preferably decoded using a Viterbi decoder designed to perform ML decoding of trellis paths that correspond to binary data (two possible phase transitions out of each trellis state) and more than two trellis states. Trellis states in the Viterbi decoder correspond to the real parts of the phase states of the phase function. The Viterbi decoder's trellis states correspond to the real parts of the phase states. Alternatively, Viterbi decoders can be designed to jointly estimate the real and imaginary parts when noncoherent detection is used.

IV. QM-CPFSK Derived from Constant Envelope M-ary CPFSK

Another way to generate QM-CPM schemes is to start with a constant envelope M-ary CPFSK scheme and to quadrature multiplex the real parts of two such signals to form an $M^2$-ary QM-CPFSK signaling scheme. For example, consider the phase state diagrams of the 3-ary, 4-ary, and 8-ary CPM schemes respectively illustrated in FIGS. 4a-4c. For further reference, we call these schemes (and the QM-CPFSK schemes derived therefrom), respectively, "3A," "4A" and "8A."

To understand how state transitions are made, note that in all three schemes, the $\alpha$-points involve two transitions, $\alpha_i \to \{\alpha_{i-1 \bmod 4}, \alpha_{i+1 \bmod 4}\}$ plus one or more other transitions. In the ternary scheme of FIG. 7a, $\alpha$-points involve a third transition to the $\beta$-point in the same northern or southern hemisphere as the $\alpha_i$. In FIG. 7a, each $\beta$-point has three transitions that lead to each of the three points in the northern or southern hemisphere, that is: $\beta_i \to \{\beta_i, \alpha_i, \alpha_{i+1},\}$. In the 4-ary scheme of FIG. 7b, the $\alpha$-points use the aforementioned two transitions plus two more that lead to the two $\beta$-points in the same (northern or southern) hemisphere as $\alpha_i$. Each $\beta$, in FIG. 7b has four transitions that lead to each of the four points in the same northern or southern hemisphere as $\beta_1$. In the 8-ary scheme of FIG. 7c, the $\alpha$-points use the aforementioned two transitions plus six more transitions that lead to all other points beside $\alpha_i$ in the same northern or southern hemisphere. All the other points in FIG. 7c have eight possible transitions that lead to each of the eight points in the same northern or southern hemisphere.

The real parts of two of the 3-ary, 4-ary or 8-ary CPM signals of FIG. 7a-4c are quadrature multiplexed using equation (5) to obtain methods 3A, 4A and 8A to effectively generate 9-ary, 16-ary and 64-ary schemes respectively. Scheme 3A uses $\alpha=30°$ in FIG. 7a to maximize $d_{min}^2$ at $d_{min}^2=1.104$ with $B_{99}T_b=0.413$, and PAPR=2.283. We can use the 9-ary signaling of scheme 3A to carry an 8-ary symbol set to transmit 3 bits per interval, and can use the one extra combination $(9-2^3=1)$ for special purposes such as frame synchronization. Scheme 4A uses $\alpha=27°$ and $\beta=71°$ in FIG. 7b to maximize $d_{min}^2$ at $d_{min}^2=0.731$ with $B_{99}T_b=0.314$ and PAPR=2.737. Scheme 8A uses $\alpha=28°$, $\beta=51°$, $\phi=68°$ and $\psi=83°$ in FIG. 7c to maximize $d_{min}^2$ at $d_{min}^2=0.218$ with $B_{99}T_b=0.213$ and PAPR=3.857.

Figure 8:
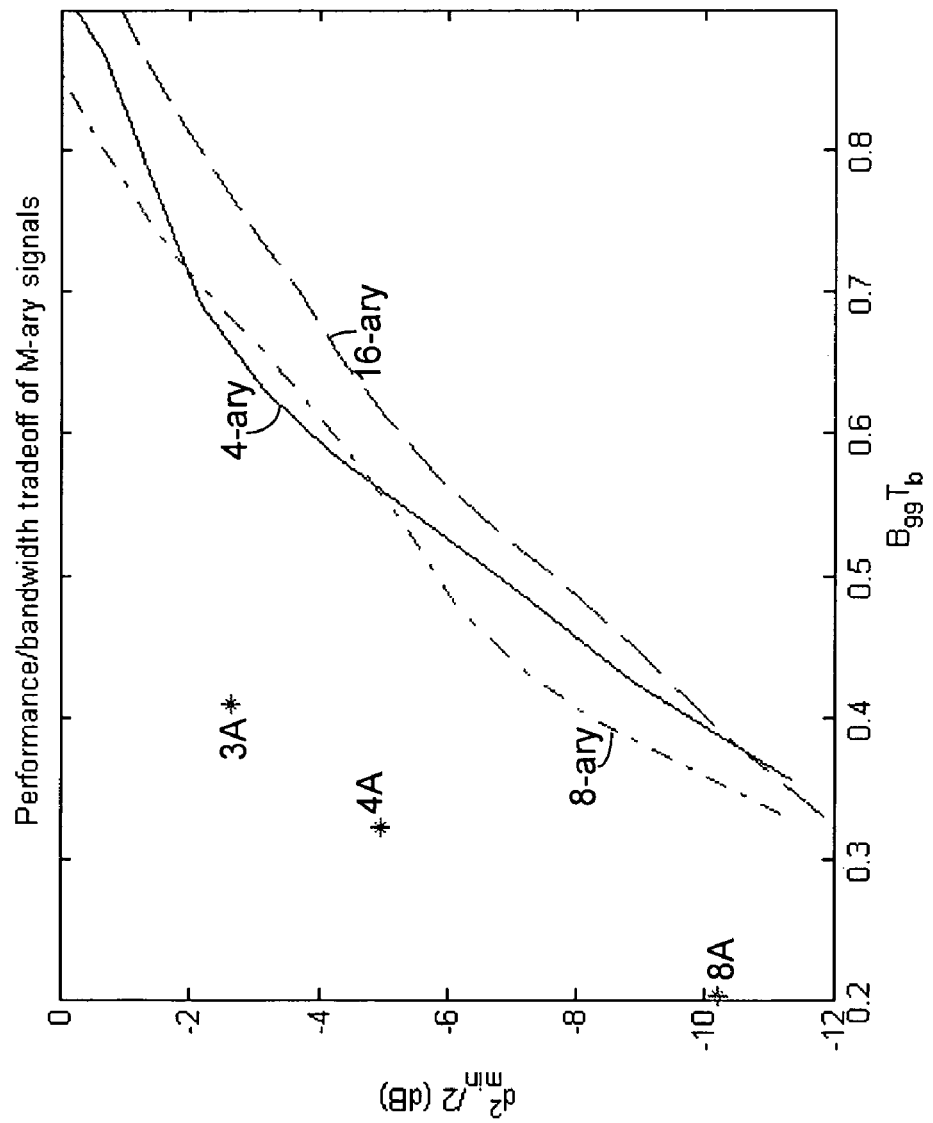
FIG. 8: Performance comparison of $M^2$-ary QM-CPFSK schemes compared to ordinary M-ary CPFSK schemes. The modulation indices of these ordinary M-ary CPFSK schemes are varied to generate their respective performance curves.

FIG. 8 compares the performance of schemes 3A, 4A and 8A to the performance of ordinary 4-ary, 8-ary and 16-ary CPM schemes. The performance curves of these ordinary M-ary CPM schemes were generated by varying their respective modulation indices. As can be seen from FIG. 8, M-ary QM-CPFSK schemes 3A, 4A and 8A achieve 8 dB or more improvement in distance than traditional M-ary CPM schemes when compared at the same bandwidth, or provide about a 40% reduction in bandwidth when compared at the same distance, although at the expense of the constant envelope property.

$M^2$-ary QM-CPM signals can be generated by generating M-ary phase function such as schemes 3A-8A. Such a phase function, or one like it, that represents M-ary data is generated. In this case, M is an integer grater than two, so that the phase function encodes more than one bit of information per symbol interval. This is achieved by using more than two phase state transitions to represent more than two possible communication symbols each symbol interval. Next respective real parts of first and second continuous phase modulation (CPM) signals are generated using the phase function (e.g., see equations 1-4)). Next the respective real parts of the first and second CPM signals are quadrature multiplexed to form a QM-CPM signal (e.g., see equations (5) or (6) below). Due to the ability to pre-phase-rotate signals in equations (1)-(3) below, taking the real part can equivalently correspond to taking a projection onto any line passing through the origin of the complex (I/Q) plane. Hence all such rotations are contemplated by the "real part" language. Again, alternative non-continuous phase signals can similarly be constructed by allowing for one or more discontinuous phase jumps between phase states in the phase function.

Figure 7:
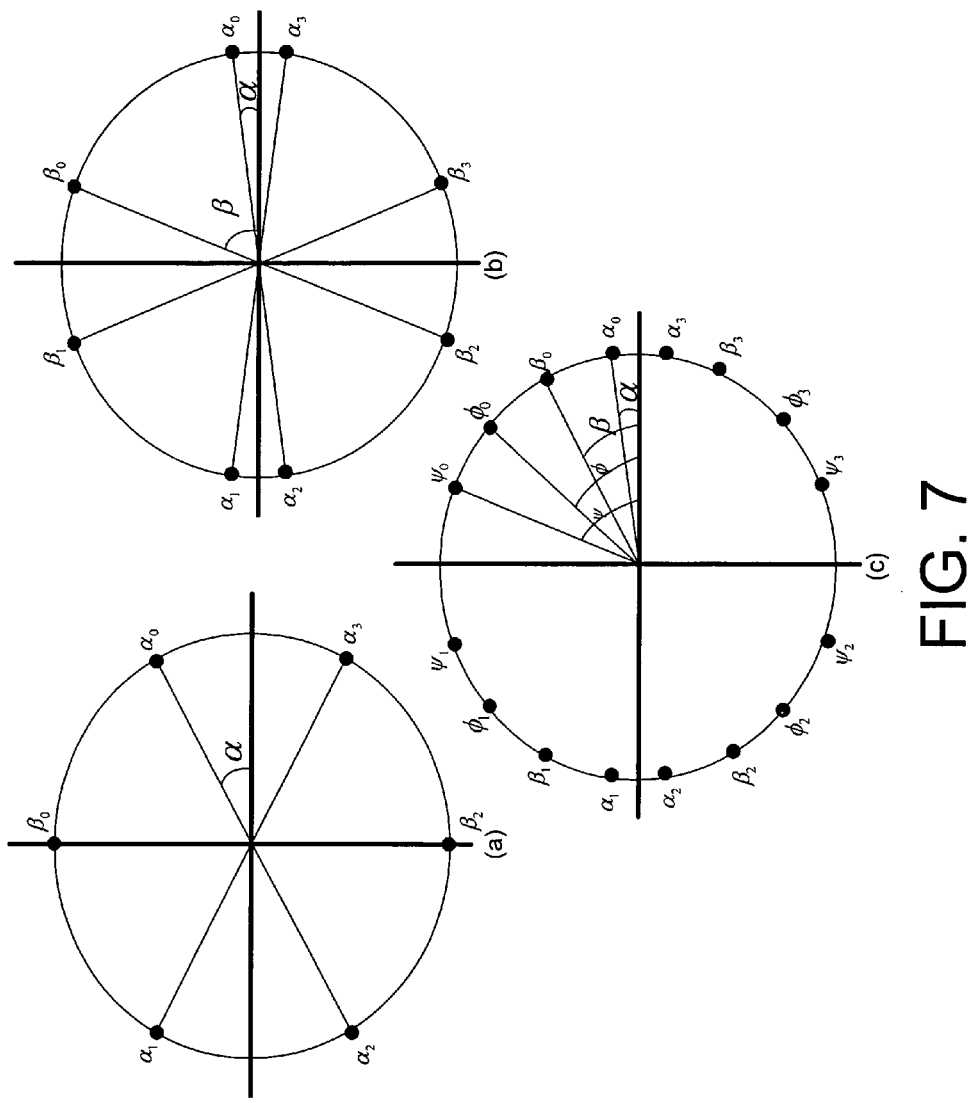
FIG. 7: M-ary CPM schemes used to generate a class of $M^2$-ary QM-CPM schemes. (a) Ternary CPM used to generated 9-ary QM-CPFSK scheme "3A," (b) 4-ary CPM used to generated 16-ary QM-CPFSK scheme "4A," (c) 8-ary CPM used to generated 64-ary QM-CPFSK scheme "8A."

$M^2$-ary QM-CPM signals can be decoded by locking onto the carrier phase and the symbol timing using maximum likelihood phase locking and symbol timing loops. The in-phase and quadrature phase signals are separated into I and Q paths in an I/Q demodulator. Each path is then preferably decoded using a Viterbi decoder designed to perform ML maximum likelihood) sequence detection/decoding of trellis paths that correspond to M-ary data (M possible phase transitions out of each trellis state). The Viterbi decoder's trellis states correspond to the real parts of the phase states. In the best embodiments found to date, the phase states of FIG. 7 are mirror images above and below the real axis, but this is not required in any of the methods described herein. Alternatively, Viterbi decoders can be designed to jointly estimate the real and imaginary parts when noncoherent detection is used.

V. Multi-Amplitude QM-CPM Derived from Multi-Amplitude CPM

Let N complex-valued baseband CPM signals be generated in accordance with equations (1)-(3). In accordance with multi-amplitude CPM, a linear combination of such signals may be written:

$$x_{MA}(t) = \sum_{i=1}^{N} r_i e^{j\alpha_i(t-\tau_i)} \quad (18)$$

$$= \sum_{i=1}^{N} r_i [\cos(\alpha_i(t-\tau_i)) + j\sin(\alpha_i(t-\tau_i))]$$

where $x_{MA}(t)$ is a multi-amplitude, complex-valued CPM baseband signal whose bandwidth is no more than the highest bandwidth of any given one of the CPM component signals. Application of equation (4) to equation (18) (without loss of generality, setting reference values $A=r_1=1$ and $\tau_1=0$) yields:

$$m_{MA}(t) = \text{Re}\left[\sum_{i=1}^{N} r_i e^{j\alpha_i(t-\tau_i)}\right] \quad (19)$$

$$= \sum_{i=1}^{N} r_i \cos(\alpha_i(t-\tau_i)).$$

We select parameters in equations (2)-(3) that allow us to recover M-ary information from the real-valued multi-amplitude trellis paths defined by equation (19). One or more underlying CPM phase functions $\alpha_i(t)$ are selected for use in equation (19) to set the bandwidth, and then a code-search type algorithm is conducted over the $r_i$ and $\tau_i$ parameters in equation (19) and the underlying parameters in equations (2) and (3) to maximize the minimum distance. PAPR is then minimized by adjusting $\tau_{I/Q}$ in equations (5)-(8). Trellis codes may also be added to the search process, but trellis coded modulation variations of the modulation schemes developed herein are outside the scope of the present patent application.

Just as PAM can be used to encode multiple bits per dimension, so can equation (19) be used to pack multiple bits of information onto the time-varying-trellis amplitude structure of $m_{MA}(t)$. Just as two such PAM signals can be quadrature multiplexed to form an $N^2$-point QAM signal constellation, so can two such $m_{MA}(t)$ signals be quadrature multiplexed to form a QM-CPM signaling scheme with $N^2$ possible trellis path combinations. We start by giving a specific example and then show how to produce a family of QM-CPFSK signaling schemes that make use of the multi-amplitude QM-CPM approach.

V.1 Multi-Amplitude QM-MSK Derived from Multi-Amplitude MSK

We demonstrate the multi-amplitude approach by constructing 2-amplitude 16-ary QM-MSK. To do so, first select a pair of MSK phase functions, $\alpha_1(t)$ and $\alpha_2(t)$, and set in equations (2)-(3): $g(t)=u(t)-u(t-T)$, $\beta_1=\beta_2=-\lambda/4$, and $h_{1,k}=h_{2,k}=0.5$ for all k. Next, set the parameters in equation (19) to $\pi_1=\pi_2=0$, $r_1=1$ and $r_2=r$, and define two 4-ary message signals $m_I(t)$ and $m_Q(t)$ as:

$$m_I(t)=A\cos[\alpha_1(t)]+Ar\cos[\alpha_2(t)]; m_Q(t)= A\cos[\alpha_3(t)]+Ar\cos[\alpha_4(t)] \quad (20)$$

where $\alpha_3(t)$ and $\alpha_4(t)$ are constructed similarly to $\alpha_1(t)$ and $\alpha_2(t)$, but with different data sequences. The value $r=\frac{1}{2}$ was numerically determined to maximize $d_{min}^2$ for each of $m_I(t)$ and $m_Q(t)$ in equation (20). The in-phase signal, $m_I(t)$ can be viewed as the real part of a 4-ary multi-amplitude MSK signal given by $$x(t)=e^{j\alpha_1(t)}+re^{j\alpha_2(t)} \quad (21)$$

Figure 9:
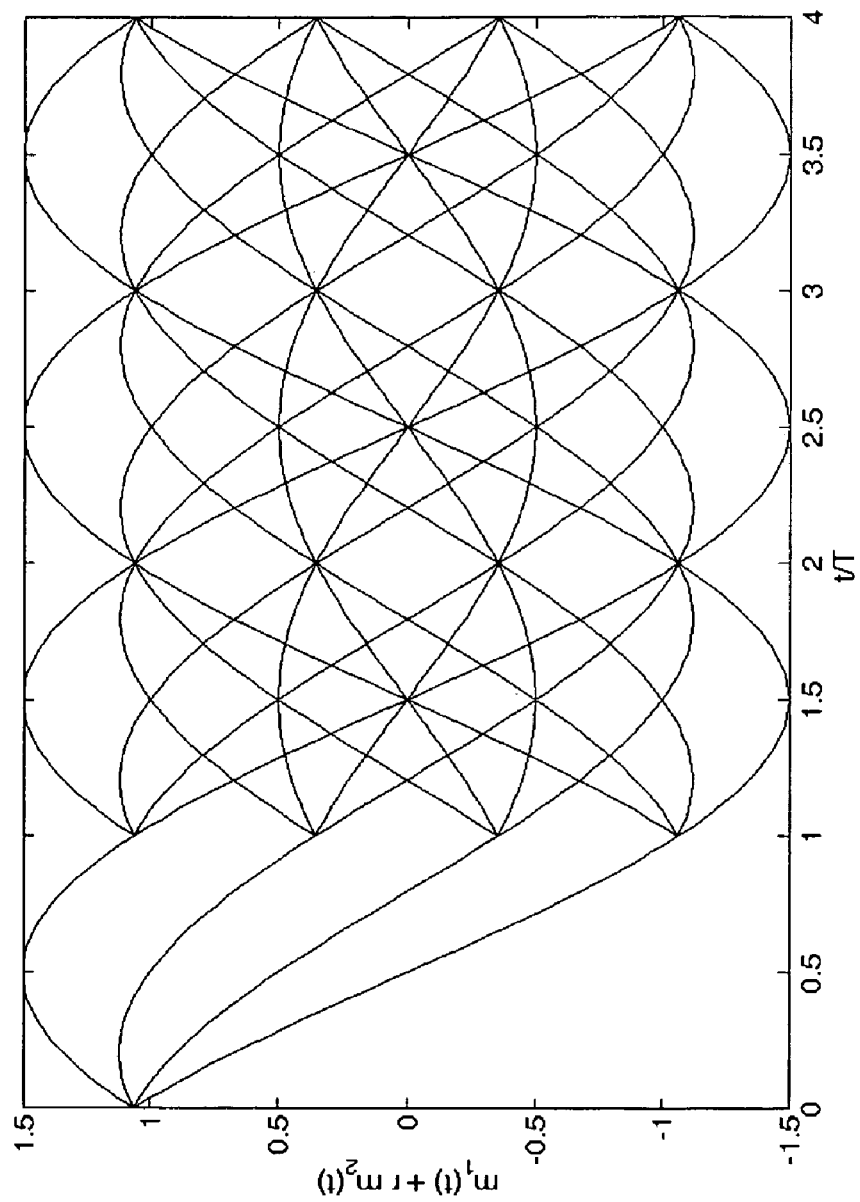
FIG. 9: The trellis structure of the m(t) signal for 2-amplitude MSK with r=1/2. This signal has four states and four transitions out of each state. A 16-ary scheme is formed by quadrature multiplexing two such 4-ary signals.

FIG. 9 illustrates $m_1(t)$'s 4-ary/4-state trellis structure. FIG. 9 is similar to FIG. 1a, but all the state transition signals are not labeled. As per FIG. 9, the trellis has four states, each with four incoming and four outgoing branches per state. This signal can thus be decoded using the same basic Viterbi decoding approach as used to decode QM-CPFSK signals. Since $m_Q(t)$ is essentially identical to $m_1(t)$ but with different data, it can thus be decoded similarly.

To evaluate the performance of this scheme, start by noting that the average transmitted power is $A^2(1+r^2)/2$ and an average symbol energy given by:

$$E_{avg.} = \frac{A^2 T(1+r^2)}{2}. \quad (22)$$

Figure 10:
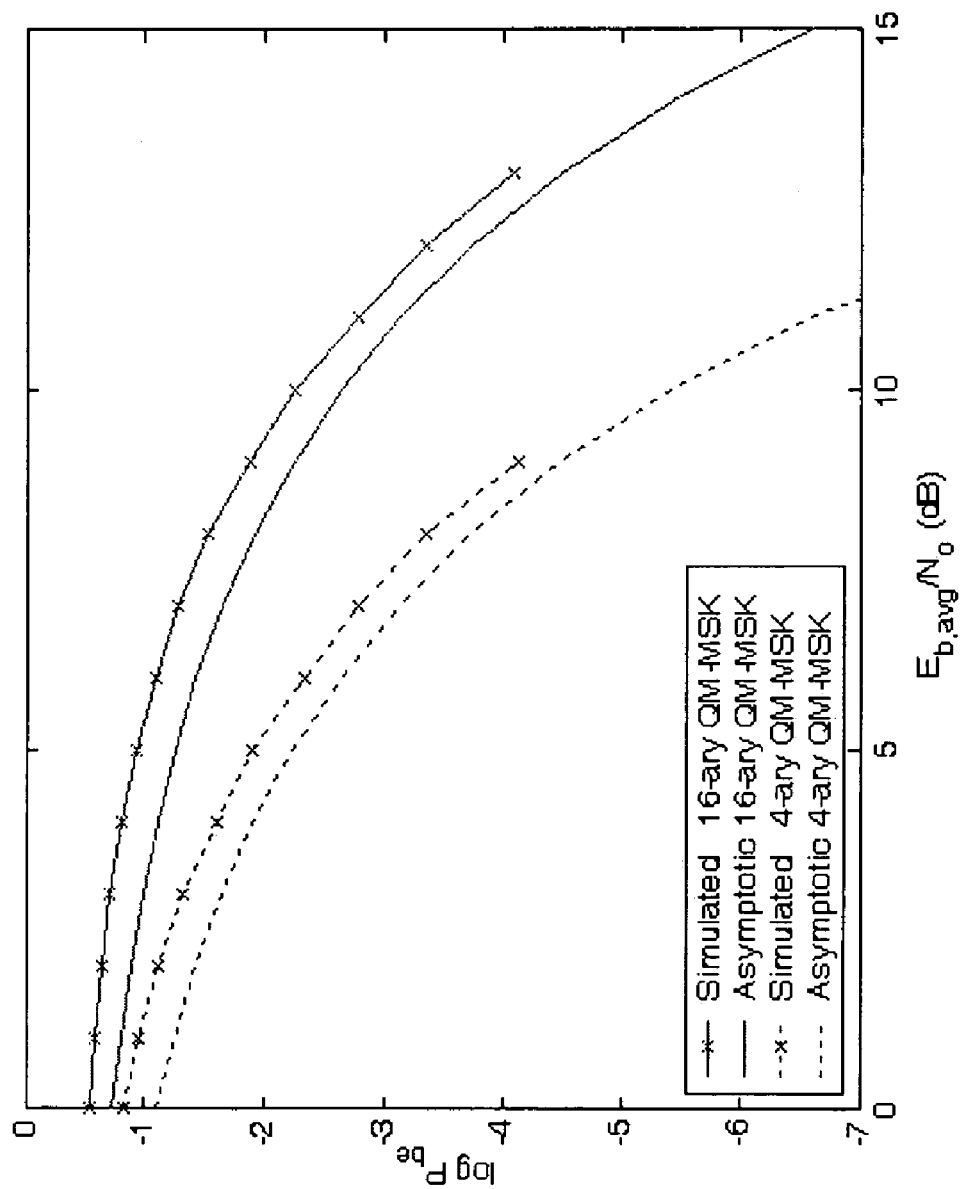
FIG. 10: Theoretical vs. simulated BER for 4-ary and 2-amplitude 16-ary QM-MSK.

The pair of 4-ary signals, $m_I(t)$ and $m_Q(t)$, taken together provide a 4×4 set of possible trellis paths and thus provide a 16-ary scheme. Therefore, $T=4T_b$ and $E_{avg}=4E_{b,avg}$. Assuming an AWGN channel, and using the same approach as equations (13)-(15), the error probability of the multi-amplitude QM-MSK signaling scheme of equation (20) is given by equation (9), but where $d_{min}^2$ is the normalized minimum distance of the signaling scheme of equation (20). When the parameters of equations (2)-(3) are selected as discussed above and when r in equation (20) is set to $r=\frac{1}{2}$, the $m_I(t)$ and $m_Q(t)$ signals have the trellis structure shown in FIG. 9, and it was numerically determined that $d_{min}^2=0.8$. It turns out that $d_{min}^2=0.8$ also for a 4-ary signaling scheme that uses 2-amplitude MSK (4-ary 2-amplitude MSK) to generate each of the QM-MSK component signals, $m_I(t)$ and $m_Q(t)$. That is, 16-ary 2-amplitude QM-MSK doubles the bits/Hz over the underlying 4-ary 2-amplitude MSK from which it is built, while maintaining the same $d_{min}^2$ in These gains come with no loss in any constant envelope property, but do result in an increase in PAPR from 1.707 for 4-ary 2-amplitude MSK to 3.07 for 16-ary 2-amplitude QM-MSK. FIG. 10 plots the theoretical versus simulated BER curves for 4-ary (1-amplitude) QM-MSK and the 16-ary 2-amplitude QM-MSK of this example. The curves indicate a close match between the theoretical and simulated curves.

It is also instructive to compare 16-ary 2-amplitude QM-MSK to a 16-ary QAM scheme that uses a square root raised cosine pulse shape with a 20% excess bandwidth. This version of RRC-QAM has the same $B_{99}T_b=0.3$ and $d_{min}^2=0.8$ as 16-ary 2-amplitude QM-MSK, but requires a long RRC matched filter delay (forty symbol intervals long) versus the four symbol interval delay of the QM-MSK Viterbi decoder. Also, this version of 16-ary 2-amplitude QM-MSK has a PAPR of 3.07 as compared the PAPR of 4.68 for this comparable version of 16-ary RRC-QAM.

We can generate a modified version of 6-ary 2-amplitude QM-MSK similar to equation (20) by setting in equation (19) $r_1=r_2=1$, $\beta_1=\beta_2=-\pi/4$ $\tau_1=0$ and $\tau_2=T/2$. In this version we obtain $d_{min}^2=0.9784$ instead of $d_{min}^2=0.8$ without any increase in bandwidth, but with a modest increase in PAPR from 3.07 to 3.28. Compared to standard 4-ary 2-amplitude MSK, this version improves performance by 0.8743 dB while reducing the bandwidth by 50%. Compared to 16-ary 20% excess bandwidth RRC QAM, this version improves performance by 0.8743 dB while reducing PAPR from 4.68 to 3.28.

V.2 A family of Multi-Amplitude QM-CPFSK Schemes

A family of multi-amplitude QM-CPFSK schemes can be constructed by using different combinations of phase functions in equation (19). For example, any combination of one or more phase functions corresponding to MSK or schemes 3S-6S and 3A-8A can be plugged into equation (19) to generate various multi-amplitude QM-CPFSK schemes. In a specific case, we could construct a 3-amplitude scheme where the first phase function is MSK, the second corresponds to scheme 3S and the third corresponds to scheme 3A. Then we would search for the best combination of $\{1, r_2, r_3\}$ and $\{0, \tau_2, \tau_3\}$ in equation (19) and along with the parameters in equations (2)-(3) of each of the three underlying phase functions to maximize the minimum distance. Then we would minimize the PAPR of the resulting $m_{M4}(t)$ in equation (19) by adjusting $\tau_{I1Q}$ in equations (5)-(8). Of course, like the multi-amplitude QM-MSK scheme, two or more of the phase functions used in equation (19) can be chosen to be the same, but possibly with some parameters varied.

In this study we generated over 50 different multi-amplitude QM-CPFSK schemes and selected the ones that provided the best performance. This study involved selecting between two and three phase functions in equation (19) corresponding to different combinations of the schemes used to construct QM-MSK and the schemes 3S-6S and 3A-8A. The parameters $r_i$ and $\tau_i$ were varied along with parameters in equation (2) and/or the parameters shown in FIGS. 2 and 4.

Figure 11:
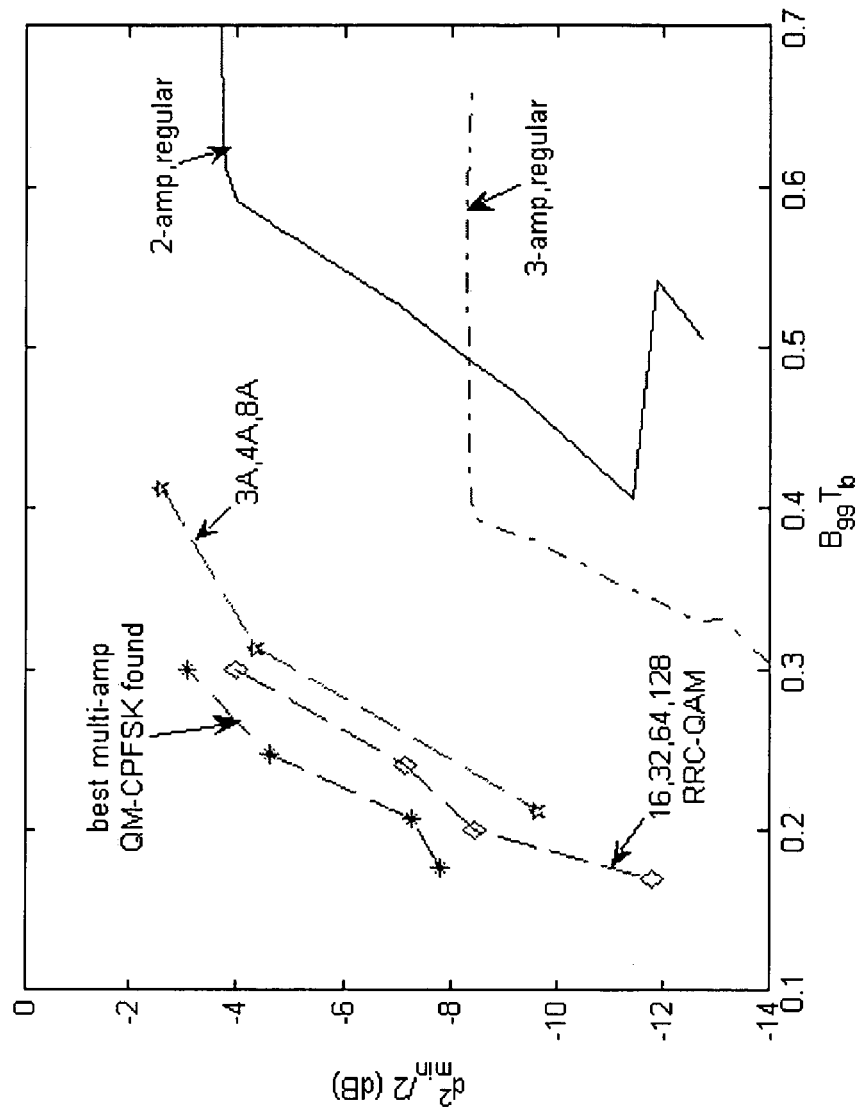
FIG. 11: Performance comparison of M-ary QM-CPFSK schemes (3A, 4A & 8A) and the best multi-amplitude M-ary QM-CPFSK schemes, to 20% excess bandwidth square root raised cosine filtered QAM and to ordinary 2-amplitude (4-ary) and 3-amplitude (8-ary) CPFSK scheme.

FIG. 11 plots the performance of the best multi-amplitude QM-CPFSK schemes found and compares this to 2-amplitude and 3-amplitude versions of ordinary multi-amplitude CPM. FIG. 11 also plots performance curves for the M-ary QM-CPFSK schemes of FIG. 7, and 20% excess bandwidth RRC QAM (16-ary, 32-ary, 64-ary and 128-ary using square or rectangular shaped constellations as applicable). It can be seen from FIG. 11 that QM-CPFSK schemes provide similar performance to 2-amplitude CPFSK, but with about a 60% reduction in bandwidth (2.5 times less bandwidth). Also, the best multi-amplitude QM-CPFSK schemes provide between 0.87 dB and 4 dB performance improvement over 20% RRC filtered QAM. If compared to unfiltered QAM, the best multi-amplitude QM-CPFSK schemes offer a bandwidth compression on the order of 60%.

The specific composition and properties of the best multi-amplitude schemes as plotted in FIG. 11 are provided in FIG. 12. In this table, a "−" indicates "not applicable." As can be seen from FIG. 12, the best multi-amplitude QM-CPFSK schemes found are built from MSK and/or schemes 3A and/or 4A. For comparison, FIG. 12 also lists performance results for RRC QAM with 20% excess bandwidth. As can be seen from FIG. 12, RRC QAM provides slightly lower performance than multi-amplitude QM-CPFSK, requires a length-40T matched filter, and results in higher PAPR (M-ary RRC QAM PAPR=7.8(M−1)/M+1) for square constellations).

Hybrid multi-amplitude QM-CPM communication signals can in general be produced by generating respective real parts of first and second continuous phase modulation (CPM) signals using a first parameter set (e.g., see equations (1)-(3)). Respective real parts of third and fourth CPM signals are also generated, but using a second parameter set which is different than the first parameter set (e.g., different parameters in equations (1) and (3)). The real parts of the first and second CPM signals are combined to construct the real part of a first multi-amplitude CPM signal. The real parts of the third and fourth CPM signals are then combined to construct the real part of a second multi-amplitude CPM signal. The real parts of a first and second multi-amplitude CPM signals are then quadrature multiplexed to form a hybrid multi-amplitude QM-CPM signal.

Hybrid multi-amplitude QM-CPM communication signals can be decoded by locking onto the carrier phase and the symbol timing using maximum likelihood phase locking and symbol timing loops. The in-phase and quadrature phase signals are separated into I and Q paths in an I/Q demodulator. Each path is then preferably decoded using a Viterbi decoder designed to perform ML maximum likelihood) sequence detection/decoding of trellis paths that correspond to the real-parts of the hybrid multi-amplitude signals. The Viterbi decoder's trellis states correspond to the real parts of the phase states in the hybrid multi-amplitude CPM scheme. Alternatively, Viterbi decoders can be designed to jointly estimate the real and imaginary parts when noncoherent detection is used.

Theorem 1

The spectra of x(t) and m(t) for the case of MSK signals are identical. Also, conditions are provided to determine how to select the phase function of equation (2) to ensure that the spectra of equations (1) and (5) are identical.

The autocorrelation of x(t) is $$R_x(\tau) = \frac{A^2}{2} \overline{e^{j\alpha(t)} e^{-j\alpha(t+\tau)}} \qquad (23)$$
$$= \frac{A^2}{2} \overline{\cos[\alpha(t) - \alpha(t+\tau)]} + j\frac{A^2}{2} \overline{\sin[\alpha(t) - \alpha(t+\tau)]}$$

where the overbar represents the average over time and all message sequences. For CPM schemes like MSK with symmetrical phase variations in $\alpha(t)$, it can be noted that, the distribution of $[\alpha(t)-\alpha(t+\tau)]$, for any given $\tau$ over all $t$ and over all sequences, has an even symmetry about zero. Hence, $\overline{\sin[\alpha(t)-\alpha(t+\tau)]}=0$. Therefore, $$R_x(\tau) = \frac{A^2}{2}\overline{\cos[\alpha(t) - \alpha(t + \tau)]}, \quad (24)$$

and the power spectral density (psd) of x(t), $S_x(f)$, is given by the FT of $R_x(\tau)$; $S_x(f)=FT[R_x(\tau)]$. The psd of m(t) is also found from its autocorrelation $R_m(\tau)$. Observing that m(t) is real, its autocorrelation can be written as $$\begin{aligned}R_m(\tau) &= \overline{m(t)m(t+\tau)} \quad (25)\\ &= \overline{\cos(\alpha(t))\cos(\alpha(t+\tau))}\\ &= \frac{1}{2}\overline{\cos[\alpha(t) - \alpha(t+\tau)]} + \frac{1}{2}\overline{\cos[\alpha(t) + \alpha(t+\tau)]}\end{aligned}$$

We consider a(t) variations that generate phase angles at the end of intervals in pairs $\alpha_k$ and $(\pi+\alpha_k)$. Many CPM forms, including full response and partial response CPFSK schemes with h=p/q with q even (e.g., MSK where p=1 and q=½), to include nonlinear and multi-h CPM forms, satisfy the above condition on α(t). For such variations of α(t), the second term of equation (25) is zero. Hence, it follows from equations (24) and (25) that the psd variations of x(t) and m(t) satisfy, $S_x(f)=A^2S_m(f)$, and thus the spectra of x(t) and m(t) are identical.

As a general design principle, any phase function of equations (2)-(3) whose parameters are selected such that the second terms in equations (23) and (25) are zero will satisfy $S_x(f)=A^2S_m(f)$ between equations (1) and (4) and thus by linearity, between equations (1) and (5) or (1) and (19).

VI. Alternative Embodiments and System Implementations

Although the present invention has been described with reference to specific embodiments, other embodiments may occur to those skilled in the art without deviating from the intended scope. It is to be expressly understood that many possibilities are envisioned but there are too many to specifically describe each one. For example, any of the equations or any sub-portion of any figure/drawing may be mixed with any other equation or any other figure/drawing or sub portion thereof to arrive at alternative envisioned embodiments. Similarly, while block diagrams are described in terms of systems, apparatus and devices, these block diagrams could also serve as flow diagrams to describe software embodiments (i.e., methods or processes), or embodiments where certain blocks or elements are implemented in hardware and others in software. Likewise, it should be noted that these statements apply to all of the figures of the aforementioned two patents incorporated herein by reference. Likewise, while certain modulator and demodulator structures are described herein, these structures also define method steps that could more generally be carried out by other structures that generate the same or equivalent results in different ways using different functions.

While CPM based signaling schemes were used to illustrate many examples, any of the broader genus of SSB-FM signaling types can be used instead, and specific examples can be formed by combining any of the concepts explicitly taught herein with any of the subject matter of any of the patents incorporated herein by reference. That is, the modulation schemes presented herein are expressly disclosed as alternatives to be combined with all of the disclosure of the applications incorporated herein by reference. All of the discussion of alternative embodiments described herein applies to the content of this application, to include applications incorporated herein by reference. Any of the modulation schemes, methods or systems presented herein can be used in any of the combinations, systems, algorithms, transmitters, receivers, embodiments, and alternative embodiments of the applications incorporated herein by reference, as long as they are compatible.

CPM is used in this application, but it should be understood that any of these QM-CPM signals can be constructed with phase jumps, to form trellis based QM-PM (QM-phase modulated) type signals. Also, although this patent uses the term "real part" it is to be understood that a phase rotation may be applied in the complex plane, so that "real part" generally refers to any line through the origin in the real-imaginary plane with some arbitrary rotation. This is because the parameters in (1)-(3) can be made to eliminate this rotation and be 100% mathematically equivalent to taking the real part after such rotation. Any of the summing junctions disclosed herein can compute additions, subtractions, or other point-wise arithmetic operation.

Also, it should be understood that the real part of a CPM signal or a PM signal is a pulse-amplitude modulation signal (PAM). Hence a QM-PM signal can be viewed as a quadrature multiplex of the real parts of two PM signals, or, equivalently, a quadrature multiplex of two PAM signals (whose amplitude levels correspond to the real parts of the PM phase states. In the case of CPM, a QM-CPM signal can be viewed as a quadrature multiplex of two PAM signals with continuous transitions between amplitude levels, much as a filtered version of QAM. That is, the consecutive steps of generating a phase function and then generating a real component of a PM signal using that phase function can be practiced by an aggregated device that directly generates the resulting PAM signal. This is an implementation detail of the signal generator, but both embodiments are contemplated as equivalents in the present invention. The difference between the present invention and ordinary QAM (QM-PM=QM-PAM=QAM) is that the QM-PM and QM-CPM embodiments of the present invention can be trellis decoded based upon the real part of an underlying phase function that has specified properties as set forth in the claims. This gives rise to a particular type trellis structure to be exploited in signal decoding/demodulation. For example, with such a trellis structure, RRC filtering can be avoided and the Viterbi decoder can be designed based on transitions between the real parts of phase states. In contrast, prior art trellis coded modulation based QAM would perform RRC filtering and trellis states would be based on the filtered data sequences. This generally leads to requirements for long matched filters and/or equalizers.

Also, while much of this disclosure focused on CPFSK based examples, more generally, CPM with pulse shaping in the phase function and non-linear phase transitions may be used with similar success. It is to be understood that the invention encompasses all such embodiments and that the particular embodiments provided herein are provided by way of example only.

Therefore, it is to be understood that the invention herein encompasses all such embodiments that do not depart from the spirit and scope of the invention as defined in the appended claims.

What we claimed is:

1. A method for use in a communications transmitter apparatus that includes a processing element coupled to memory, the method comprising:

the processing element generating respective real parts of first and second continuous phase modulation (CPM) baseband signals using respective first and second phase functions driven by respective first and second binary data sequences, wherein the first and second phase functions each individually represent binary data as transitions among at least more than two phase states that each have positive imaginary parts and transitions among zero or more phase states with negative imaginary parts; and quadrature multiplexing the respective real parts of the first and second CPM baseband signals to form a quadrature multiplexed continuous phase modulated (QM-CPM) signal; and coupling the QM-CPM signal onto a channel for subsequent reception by at least one receiver apparatus.

2. The method of claim 1, wherein the first CPM baseband signal is given by $x(t)=A[\cos(\alpha_1(t))+j\sin(\alpha_1(t))]$, where A is a constant amplitude, $\alpha_1(t)$ is the first phase function driven by the first binary data sequence, and the QM-CPM signal is given by $s(t)=A[m_I(t)\cos(\omega_c t)-m_Q(t-\tau_{I_1Q})\sin(\omega_c t)]$, where $\tau_{I_1Q}$ is a time-shift parameter, $\omega_c$ is a carrier frequency, $m_I(t)=\cos(\alpha_1(t))$, $m_Q(t)=\cos(\alpha_2(t))$, and $\alpha_2(t)$ is the second phase function driven by the second binary data sequence.

3. A method for use in a communications transmitter apparatus that includes a processing element coupled to memory, the method comprising the processing element generating respective real parts of first and second continuous phase modulation (CPM) baseband signals using respective first and second phase functions driven by respective first and second M-ary data sequences, wherein M is an integer greater than two, the first and second phase functions each individually represent M-ary data as transitions among at least M phase states with positive imaginary parts and transitions among zero or more phase states with negative imaginary parts; and quadrature multiplexing the respective real parts of the first and second CPM baseband signals to form a quadrature multiplexed-continuous phase modulated (QM-CPM) signal; and coupling the QM-CPM signal onto a channel for subsequent reception by at least one receiver apparatus.

4. The method of claim 3, wherein the QM-CPM signal is given by $s(t)=A[m_I(t)\cos(\omega_c t)-m_Q(t-\tau_{I_1Q})\sin(\omega_c t)]$, where $\tau_{I_1Q}$ is a time-shift parameter, $\omega_c$ is a carrier frequency, and $m_I(t)=\cos(\alpha_1(t))$ and $m_Q(t)=\cos(\alpha_2(t))$ are the respective real parts of the first and second CPM baseband signals.

5. A method for use in a communications transmitter apparatus that includes a processing element coupled to memory, the method comprising:

the processing element generating respective real parts of first, second, third and fourth continuous phase modulation (CPM) baseband signals using respective first, second third and fourth phase functions driven by respective first, second, third and fourth M-ary data sequences, wherein M is an integer greater than two, the respective first, second third and fourth base functions each individually represent M-ary data as transitions among at least M phase states with positive imaginary parts and transitions among zero or more phase states with negative imaginary parts;

combining the real parts of the first and second CPM baseband signals to construct a real part of a first multi-amplitude CPM signal;

combining the real parts of the third and fourth CPM baseband signals to construct a real part of a second multi-amplitude CPM signal; and quadrature multiplexing the real parts of the first and second multi-amplitude CPM signals to form a multi-amplitude quadrature multiplexed continuous phase modulated (QM-CPM) signal; and coupling the multi-amplitude QM-CPM signal onto a channel for subsequent reception by at least one receiver apparatus.

6. The method of claim 5, the QM-CPM signal is given by $s(t)=A[m_I(t)\cos(\omega_c t)-m_Q(t-\tau_{I_1Q})\sin(\omega_c t)]$, where $\tau_{I_1Q}$ is a time-shift parameter, $\omega_c$ is a carrier frequency, and $$m_I(t) = \sum_{i=1}^{2} r_i \cos(\alpha_i(t-\tau_i)) \text{ and}$$

$$m_Q(t) = \sum_{i=3}^{4} r_i \cos(\alpha_i(t-\tau_i))$$

correspond to the respective real parts of the first and second multi-amplitude CPM signals.

7. A method for use in a communications transmitter apparatus that includes a processing element coupled to memory, the method comprising:

the processing element generating a first continuous phase modulation (CPM) signal using a first phase function defined by a first parameter set, driven by a first data sequence;

the processing element generating a second CPM signal using a second phase function driven by a second data sequence, wherein the second phase function is defined by a second parameter set which is different than the first parameter set; and quadrature multiplexing respective real parts of the first and second CPM signals to construct a hybrid multi-amplitude quadrature multiplexed (QM-CPM) signal; and coupling the hybrid multi-amplitude QM-CPM signal onto a channel for subsequent reception by at least one receiver apparatus.

8. The method of claim 7, wherein the first phase function corresponds to a 3-ary phase function and the second phase function corresponds to a minimum shift keying (MSK) phase function.

9. A method for use in a communications transmitter apparatus that includes a processing element coupled to memory, the method comprising:

the processing element generating respective real parts of first and second continuous phase modulation (CPM) baseband signals using a first phase function defined by a first parameter set, driven by respective first and second data sequences;

the processing element generating respective real parts of third and fourth continuous CPM baseband signals using a second phase function defined by a second parameter set which is different than the first parameter set, driven by respective third and fourth data sequences;

the processing element combining the real parts of the first and third CPM baseband signals to construct a real part of a first multi-amplitude CPM signal;

the processing element combining the real parts of the second and fourth CPM baseband signals to construct a real part of a second multi-amplitude CPM signal; and quadrature multiplexing the real parts of the first and second multi-amplitude CPM signals to form a hybrid multi-amplitude quadrature multiplexed continuous phase modulated (QM-CPM) signal; and coupling the hybrid multi-amplitude QM-CPM signal onto a channel for subsequent reception by at least one receiver apparatus.

10. The method of claim 9, wherein the first phase function corresponds to a 3-ary phase function and the second phase function corresponds to a minimum shift keying (MSK) phase function.

11. The method of claim 9, wherein the first phase function corresponds to a 4-ary phase function and the second phase function corresponds to a minimum shift keying (MSK) phase function.

12. The method of claim 2, wherein the first phase function is of the form:

$$\alpha_1(t) = 2\pi \sum_{k=-\infty}^{\infty} h_k I_k \int_{-\infty}^{t} g(\tau - kT)\,d\tau + \beta \quad (2)$$

where, $h_k$ is a modulation index used in the $k^{th}$ symbol interval, T is a symbol duration, g(t) is a baseband pulse-shape waveform, $I_k$ is the first binary data sequence, and $\beta$ is a fixed phase-offset.

13. The method of claim 12, wherein g(t)=1 for $0 \leq t < T$, and is zero at all other times, so that the first phase function is of the form:

$$\alpha(t) = \theta_k + 2\pi h_k I_k \left(\frac{t-kT}{2T}\right) + \beta \quad \text{for } kT \leq t < (k+1)T \quad (3)$$

where, $$\theta_k = \pi \sum_{i=-\infty}^{k-1} h_i I_i$$

is a phase state at the beginning of the $k^{th}$ symbol.

14. The method of claim 12, wherein the second phase function is of the form:

$$\alpha_2(t) = 2\pi \sum_{k=-\infty}^{\infty} h_k I_k^{(2)} \int_{-\infty}^{t} g(\tau - kT)\,d\tau + \beta \quad (2)$$

wherein $I_k^{(2)}$ is the second binary data sequence.

15. The method of claim 14, wherein the first and second binary data sequences are encoded.

16. The method of claim 14, wherein the first and second binary data sequences are trellis encoded.

* * * * *